(12) United States Patent
Bertucci et al.

(10) Patent No.: US 12,466,623 B2
(45) Date of Patent: Nov. 11, 2025

(54) LOCKING MECHANISMS TO SECURE MULTIPLE CART COMPONENTS

(71) Applicant: Rubbermaid Commercial Products LLC, Atlanta, GA (US)

(72) Inventors: Jeffrey S. Bertucci, Denver, NC (US); Brian Wortham Downing, Charlotte, NC (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 233 days.

(21) Appl. No.: 18/099,860

(22) Filed: Jan. 20, 2023

(65) Prior Publication Data

US 2023/0249883 A1    Aug. 10, 2023

Related U.S. Application Data

(60) Provisional application No. 63/306,515, filed on Feb. 4, 2022, provisional application No. 63/267,585, filed on Feb. 4, 2022.

(51) Int. Cl.
*B65D 55/14* (2006.01)
*B62B 3/00* (2006.01)
*E05B 47/00* (2006.01)
*E05B 65/52* (2006.01)

(52) U.S. Cl.
CPC ............. *B65D 55/14* (2013.01); *B62B 3/004* (2013.01); *B62B 3/005* (2013.01); *E05B 47/0045* (2013.01); *E05B 65/5261* (2013.01)

(58) Field of Classification Search
CPC ......... B65D 55/14; B62B 3/004; B62B 3/005; E05B 47/0045; E05B 65/5261; Y10T 70/7904
USPC ............. 70/82–84, 158, 276, 413; 109/59 R; 292/11, 14, 251.5, DIG. 21
See application file for complete search history.

(56) References Cited

U.S. PATENT DOCUMENTS

| | | | | | |
|---|---|---|---|---|---|
| 2,177,996 | A | * | 10/1939 | Raymond | ........... E05B 47/0044 70/276 |
| 2,440,541 | A | * | 4/1948 | Gash | ............................ 292/120 |
| 2,730,392 | A | * | 1/1956 | Thiebaud | .............. E05B 47/004 292/201 |
| 2,975,497 | A | * | 3/1961 | Budreck | .............. A44B 15/002 70/459 |

(Continued)

*Primary Examiner* — Suzanne L Barrett
(74) *Attorney, Agent, or Firm* — Eversheds Sutherland (US) LLP

(57) ABSTRACT

Systems, methods, and apparatuses are disclosed for locking mechanisms to secure multiple cart components. Example embodiments may include a cart with a lower platform, an upper platform, a first storage area disposed between the lower platform and the upper platform, and a second storage area disposed adjacent to the upper platform. Some embodiments may include a door configured to secure the first storage area, where the door is configured to rotate outwards with respect to the upper platform, a hatch configured to secure the second storage area, where the hatch is configured to rotate upwards with respect to the upper platform, and a locking mechanism coupled to the upper platform and configured to lock both the hatch and the door in a locked position. Unlocking the locking mechanism can unlock both the first access panel and the second access panel.

16 Claims, 17 Drawing Sheets

(56) References Cited

U.S. PATENT DOCUMENTS

| | | | | |
|---|---|---|---|---|
| 3,421,348 | A | * | 1/1969 | Hallmann ............ E05B 47/0042 70/276 |
| 3,782,147 | A | * | 1/1974 | Hallmann ............ E05B 47/0042 70/276 |
| 4,285,220 | A | * | 8/1981 | Kajita ................. E05B 47/0041 70/276 |
| 4,307,589 | A | * | 12/1981 | Kajita ................. E05B 47/0041 70/276 |
| 4,729,614 | A | * | 3/1988 | Nadler ................. H05K 5/0208 312/310 |
| 4,741,186 | A | * | 5/1988 | Martin ................. E05B 65/087 70/82 |
| 5,249,443 | A | * | 10/1993 | Anderson .............. E05B 9/084 70/370 |
| 6,641,238 | B2 | * | 11/2003 | Branz .................... F25D 23/02 312/139.2 |
| 8,746,022 | B2 | * | 6/2014 | Francois ................... E05C 5/02 70/379 R |
| 2015/0267458 | A1 | * | 9/2015 | Cardinal ................. E05G 1/026 109/59 R |

* cited by examiner

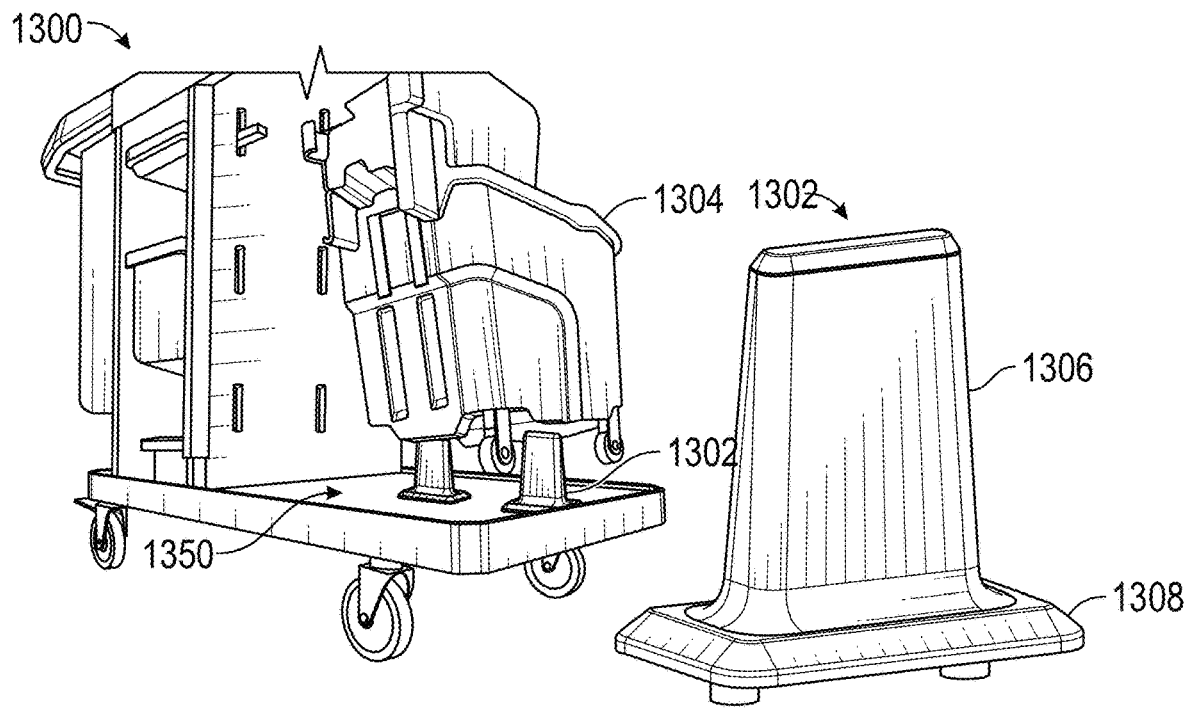
FIG. 11
FIG. 12
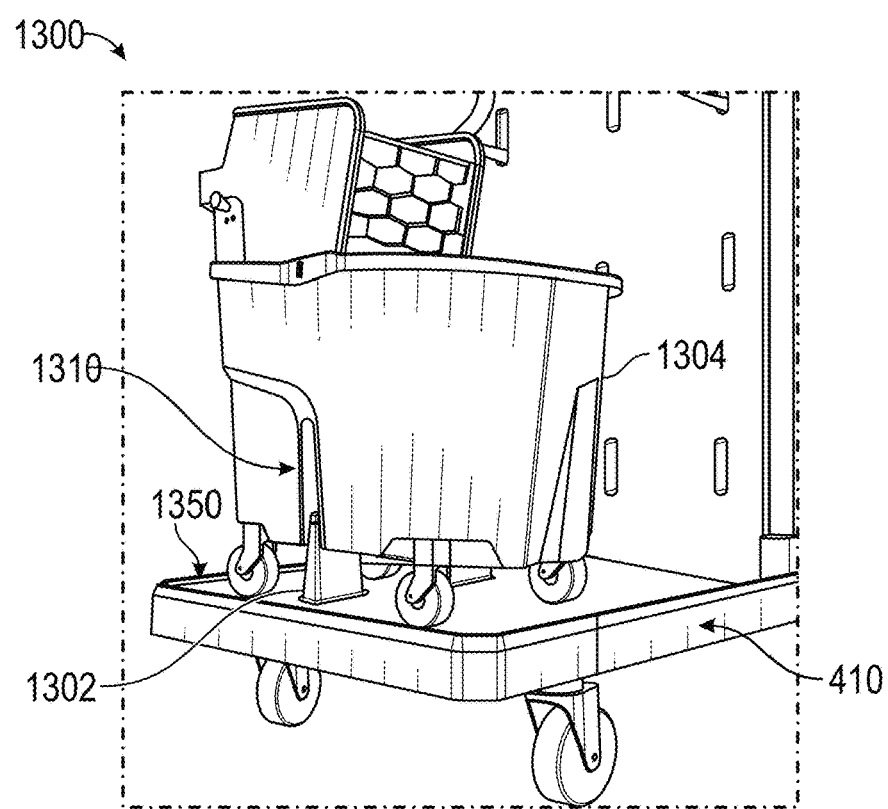
FIG. 13

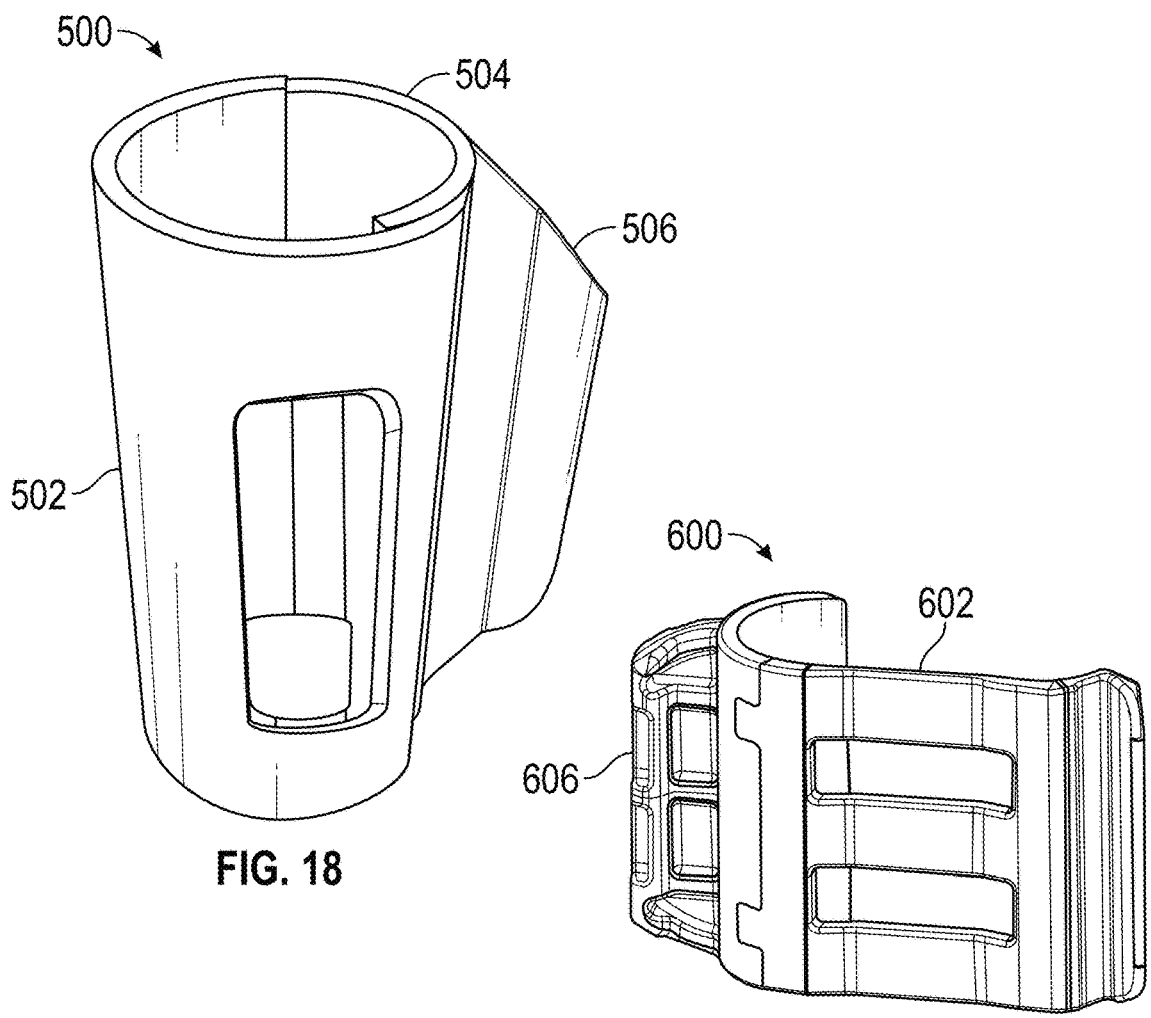
FIG. 18
FIG. 19
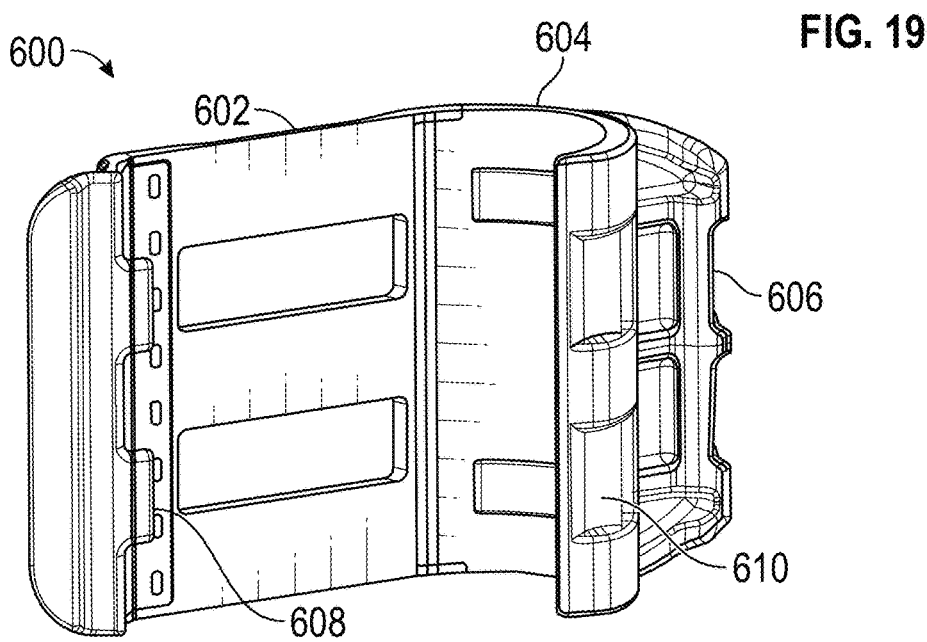
FIG. 20

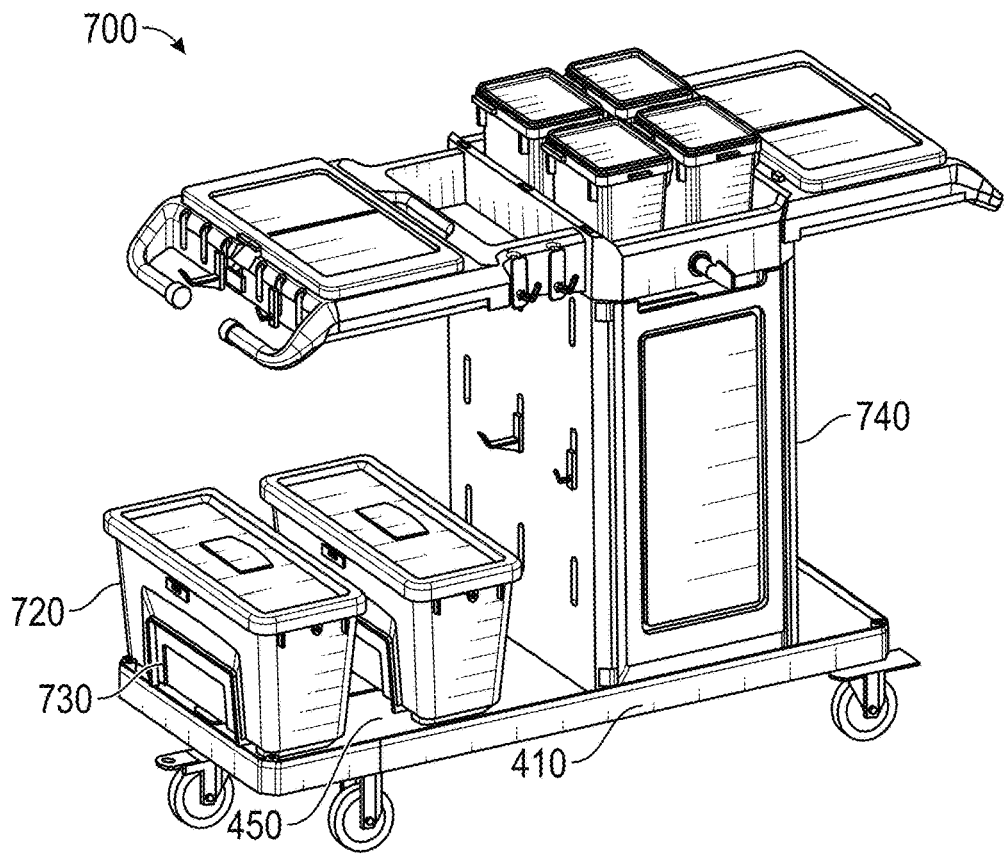
FIG. 21
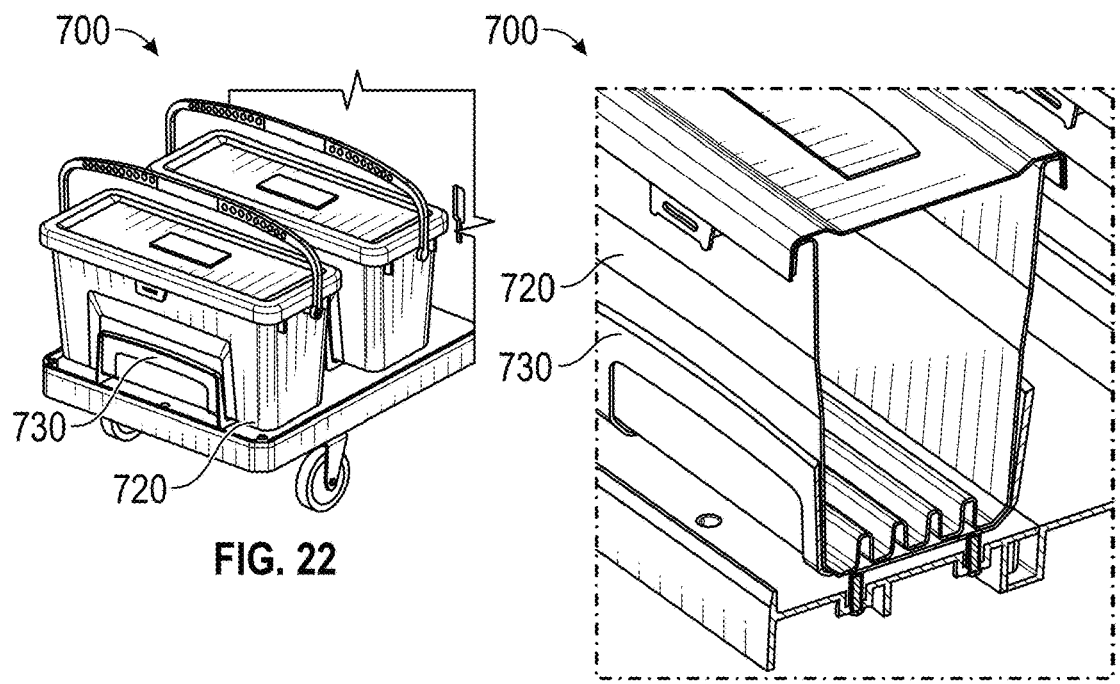
FIG. 22
FIG. 23

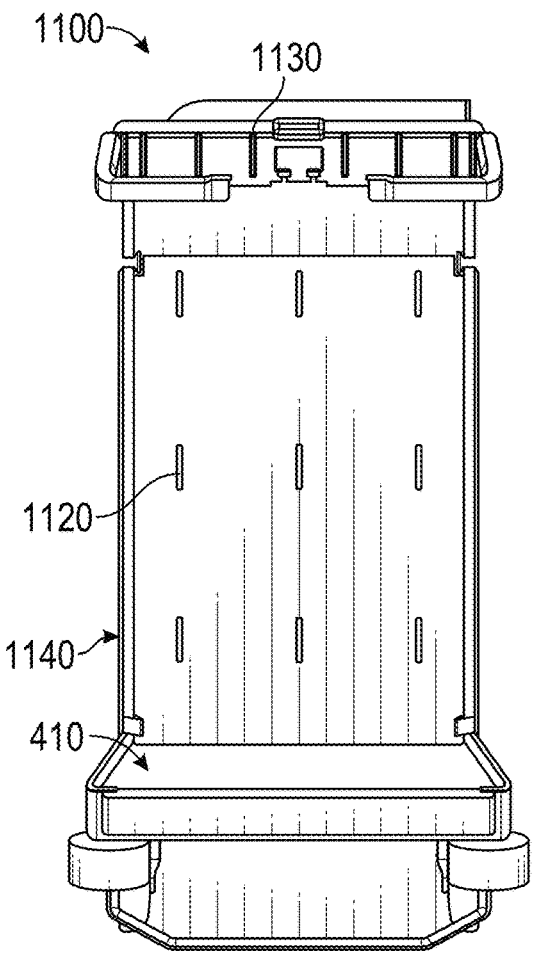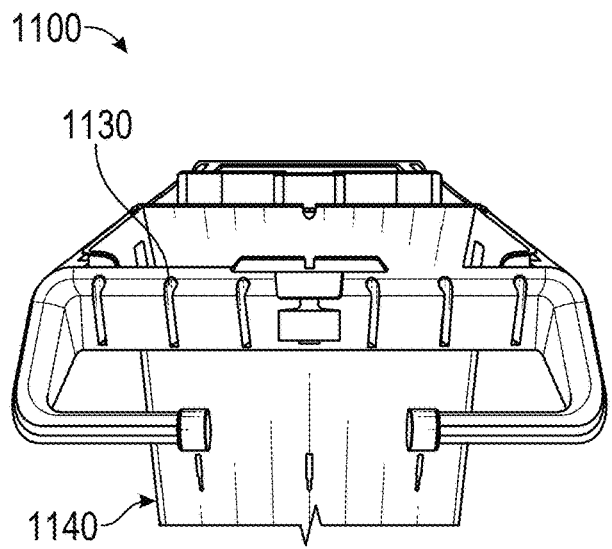
FIG. 32  FIG. 33
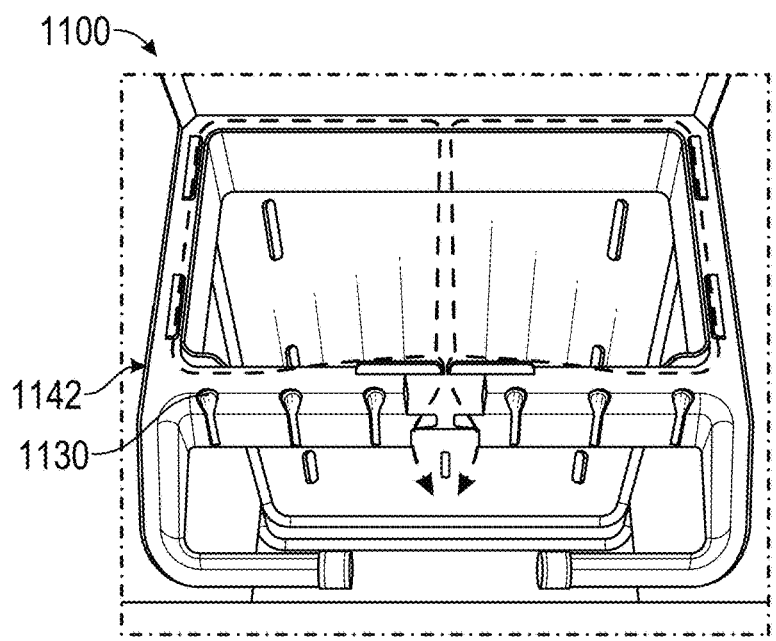
FIG. 34

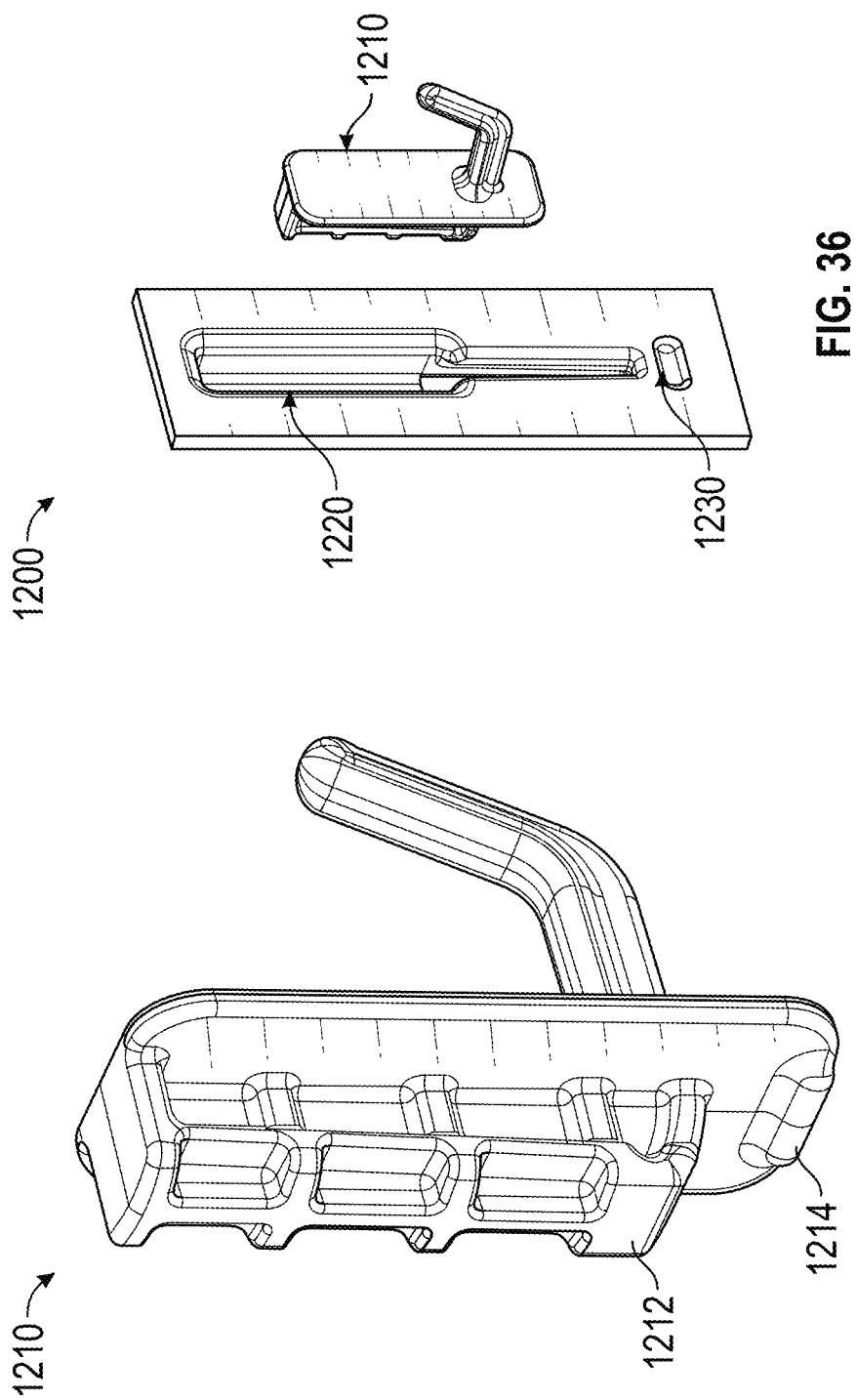

LOCKING MECHANISMS TO SECURE MULTIPLE CART COMPONENTS

CROSS-REFERENCE TO RELATED APPLICATIONS

This application claims the benefit of U.S. Provisional Application No. 63/267,585, filed Feb. 4, 2022, and claims the benefit of U.S. Provisional Application No. 63/306,515, filed Feb. 4, 2022, both of which are hereby incorporated by reference in their entireties.

TECHNICAL FIELD

The present disclosure relates generally to cart systems, for example, for carts that can be moved to transport objects, and more specifically to locking mechanisms for carts, such as locking mechanisms for carts that can be moved to transport objects.

BACKGROUND

Rollable carts may be used for various purposes, such as to transport items from one area to another. Some rollable carts may be used for housekeeping in hotels and other facilities, while other rollable carts may be used for purposes such as cleaning medical facilities. Some carts may have secured portions, such as shelves or bins that are accessible via a door. In some instances, carts may have more than one secured portion. Secured portions may be locked to prevent unauthorized access. To reduce the cumbersome nature of accessing secured portions, and to facilitate ease of use of rollable carts, locking mechanisms to secure multiple cart components may be desired.

SUMMARY

Embodiments include rollable carts, such as a rollable cart comprising a lower platform, an upper platform, a first storage area disposed between the lower platform and the upper platform, and a second storage area disposed adjacent to the upper platform. Some embodiments include a first access panel configured to secure the first storage area, a second access panel configured to secure the second storage area, and a locking mechanism configured to lock both the first access panel and the second access panel in a locked position. In some embodiments, the first access panel is a hatch, and the second access panel is a door. The first access panel may be configured to rotate upwards with respect to the upper platform, and the second access panel may be configured to rotate outwards with respect to the upper platform. Unlocking the locking mechanism unlocks both the first access panel and the second access panel. The locking mechanism may be coupled to the upper platform. The locking mechanism may include a double cam having a first hook that engages the first access panel, and a second hook that engages the second access panel. The locking mechanism may include a body, a bezel coupled to the body, a piston with a magnet configured to rotate inside the body, a screw configured to couple the double cam to the piston. The piston with magnet may move axially inside the body during unlocking or locking of the locking mechanism. Some embodiments may include a key fob configured to engage the locking mechanism, the key fob having a magnet configured to move the lock magnet to the second position. In some embodiments, the key fob further includes a geometric feature on a face of the key fob.

In some embodiments, the locking mechanism may include a body, a bezel coupled to the body, a piston configured to rotate inside the body, a screw configured to couple the double cam to the piston, and a spring disposed in the body and configured to bias the piston towards the bezel. The piston moves axially inside the body during unlocking or locking of the locking mechanism. Some embodiments include a key fob configured to engage the locking mechanism, the key fob having a magnet configured to interact with the bezel. The key fob may further have a geometric feature on a face of the key fob.

In other embodiments, a cart may include a lower platform, an upper platform, a first storage area disposed between the lower platform and the upper platform, a second storage area disposed adjacent to the upper platform, a hatch configured to secure the first storage area, where the hatch is configured to rotate upwards with respect to the upper platform. Some embodiments may include a door configured to secure the second storage area, where the door is configured to rotate outwards with respect to the upper platform, and a locking mechanism coupled to the upper platform and configured to lock both the hatch and the door in a locked position, where unlocking the locking mechanism unlocks both the first access panel and the second access panel. The locking mechanism may include a double cam comprising a first hook that engages the hatch, and a second hook that engages the door. The locking mechanism may include a body, a bezel coupled to the body, a piston with magnet configured to rotate inside the body, where the piston moves axially inside the body during unlocking or locking of the locking mechanism, and a screw configured to couple the double cam to the piston. The piston with magnet is configured to slide inside the body from a first position to a second position, where the lock magnet engages the screw at the first position, and where the lock magnet disengages the screw at the second position, where the locking mechanism cannot be unlocked when the lock magnet is in the first position—thereby allowing the cam to rotate from a vertical locked position to a horizontal unlocked position. The locking mechanism may include a spring disposed in the body and configured to bias the piston towards the bezel. Some embodiments may include a key fob configured to engage the locking mechanism, the key fob having a magnet, and a geometric feature on a face of the key fob.

BRIEF DESCRIPTION OF THE DRAWINGS

FIG. 11 is a conceptual perspective view of a cart system including the platform of FIG. 8A, a bucket retention tool, and an intermediate position of a bucket being placed on the platform.

FIG. 12 is a conceptual perspective view of a riser of the bucket retention tool of the cart system of FIG. 11.

FIG. 13 is a conceptual perspective view of the cart system of FIG. 11, in a final configuration with the bucket secured to the bucket retention tool.

FIG. 18 is a conceptual perspective view of a tool holder including an elastomeric member for use with a cart system including a tower including a holder slot.

FIG. 19 is a conceptual front perspective view of a tool holder including a band for use with a cart system including a tower including a holder slot.

FIG. 20 is a conceptual rear perspective view of the tool holder of FIG. 19.

FIG. 21 is a conceptual perspective view of a cart system including the platform of FIG. 8A, a tower, and a container secured to a bucket frame.

FIG. 22 is a conceptual partial perspective view of the cart system of FIG. 21.

FIG. 23 is a conceptual partial cross-sectional view of the cart system of FIG. 21.

FIG. 32 is a conceptual front view of a cart system including the platform of FIG. 8A, a tower, and a plurality of holder slots.

FIG. 33 is a conceptual partial perspective view of the cart system of FIG. 32.

FIG. 34 is a conceptual partial top view of the cart system of FIG. 32.

FIG. 35 is a conceptual perspective view of a tool holder for use with a tool holder assembly of a cart system.

FIG. 36 is a conceptual partial perspective view of a tool attachment system including tool holder and a holder slot and a dimple defined by a side panel of a tower.

Figure 1:
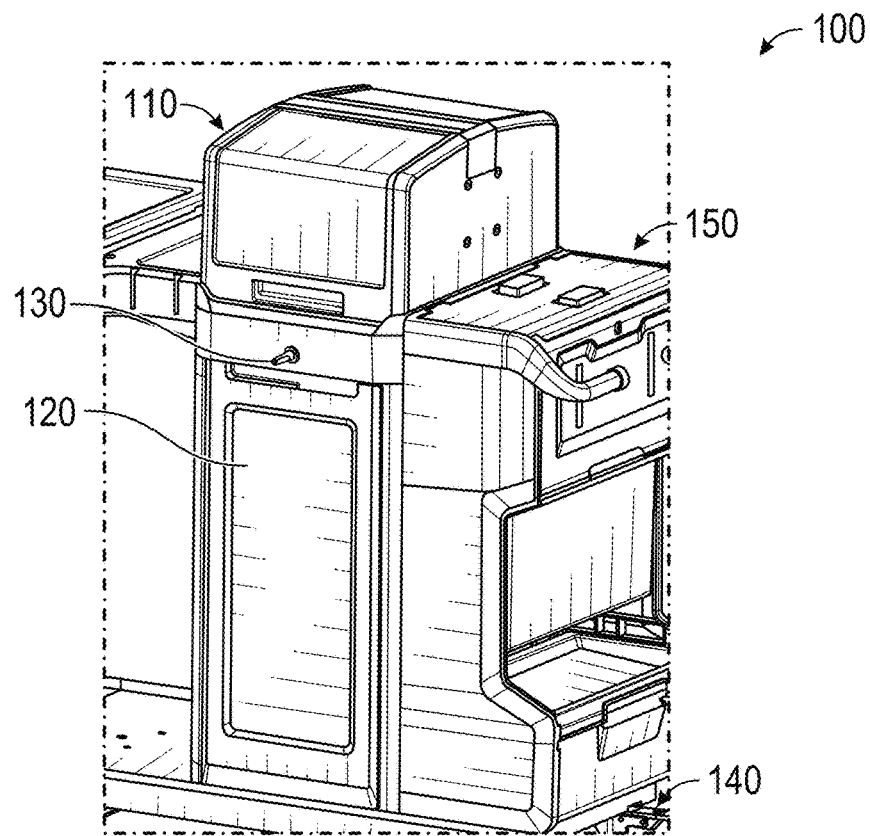
FIG. 1 is a schematic illustration of an example cart having a locking mechanism to secure multiple cart components in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Carts may be used to store and/or transport various objects from one location to another. For example, a cart may have one or more wheels and may therefore be rollable from one location to another to transport objects on the cart. Carts can be used for various applications, such as transporting cleaning supplies for hospitals or housekeeping in hotels, transporting hardware for maintenance applications, and so forth. Carts may be configured to support components such as removable bins, garbage cans, mop buckets, trash liners, and so forth.

Some carts may include areas or portions that can be secured. For example, a shelf area can be secured by a lockable door, or an area on top of a cart can be secured by a door or hatch that can be locked. For such secured areas, a user of the cart may typically have to lock and unlock the door or other access panel using a physical object, such as a key. For carts with more than one secure area, use of more than one key may be cumbersome.

Embodiments of the disclosure include carts with locking mechanisms that secure more than one secured area at the same time. For example, locking mechanisms may secure a hatch that allows access to a first secured area, as well as a door that allows access to a second secured area. Locking or unlocking the locking mechanism may lock or unlock access to both the first secured area and the second secured area at the same time. Some embodiments may include more than two secured areas that can be locked and unlocked at the same time using the locking mechanism. Some embodiments include a magnetic locking mechanism that may facilitate ease of use during the locking or unlocking of secured areas, while at the same time preventing unauthorized access. For example, the magnetic locking mechanism may not be manipulated using a screwdriver or other tool.

Other embodiments may include a mechanical locking mechanism with a magnetic component that also disallows unauthorized access.

Figure 2:
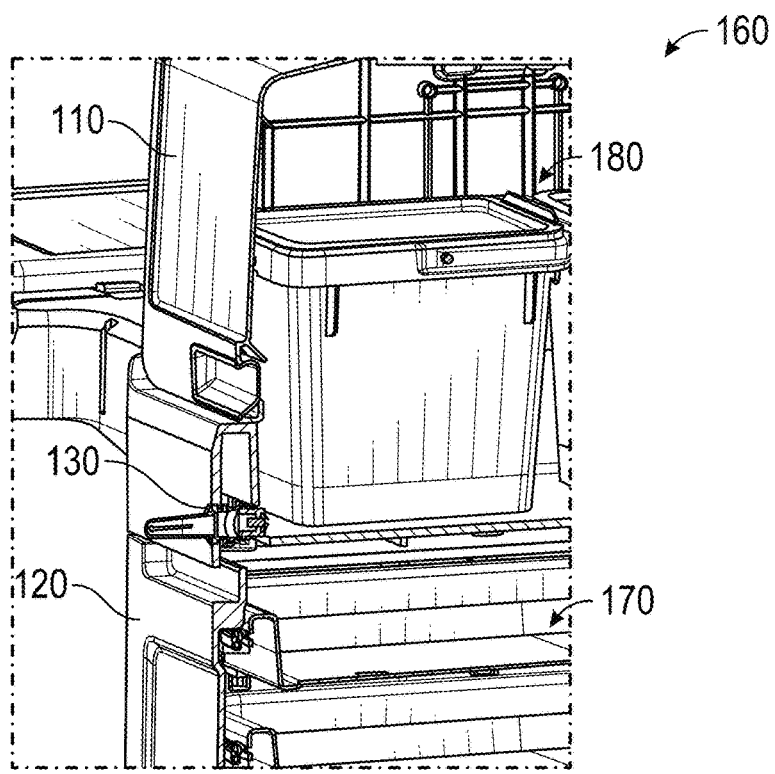
FIG. 2 is a partial cross-sectional view of the example cart of FIG. 1 in accordance with one or more embodiments of the disclosure.

FIG. 1 is a schematic illustration of an example cart 100 having a locking mechanism to secure multiple cart components in accordance with one or more embodiments of the disclosure. FIG. 2 is a partial cross-sectional view of the example cart of FIG. 1 in accordance with one or more embodiments of the disclosure. Other embodiments may include additional or fewer components. The illustration of FIGS. 1-2 may not be to scale, and may not be illustrated to scale with respect to other figures.

In FIGS. 1-2, the cart 100 may be a rollable cart that includes a lower platform 140 and an upper platform 150. One or more wheels may be coupled to the lower platform 140. The upper platform 150 may support one or more additional components, such as a work surface, one or more liners, and/or other components depending on the cart application. The cart 100 may include a hatch 110 that can open to provide access to a first secure area 170. Valuable items or items with otherwise restricted access may be stored inside the first secure area. The hatch 110 may be lockable via a locking mechanism 130. The cart 100 may include a door 120 that can open to provide access to a second secure area 180, such as a shelving area or bin area where valuable items or items with otherwise restricted access may be stored. The door 120 may be lockable via the locking mechanism 130. As depicted in the cross-sectional view 160 of FIG. 2, various bins or containers can be stored in the first secure area 170 and/or the second secure area 180.

The locking mechanism 130 may be configured to lock and unlock the hatch 110 and the door 120 at the same time. In some embodiments, the locking mechanism 130 may be a magnetic locking mechanism that provides the ability to lock and unlock the door 120 and hatch 110 at the same time using a key fob, instead of a typical metal key). The key fob may be able to lock and unlock the door 120 and the hatch 110, as the key fob may have a specific shape opening to engage the locking mechanism 130.

Accordingly, the cart 100 may include the lower platform 140, the upper platform 150, a first storage area, such as the second secure area 180, disposed between the lower platform 140 and the upper platform 150, and a second storage area, such as the first secure area 170, disposed adjacent to the upper platform 150. The cart 110 may include a first access panel, such as the door 120, configured to secure the first storage area, and a second access panel, such as the hatch 110, configured to secure the second storage area. The cart may include the locking mechanism 130 that is configured to lock both the first access panel and the second access panel in a locked position, and/or to unlock both the first access panel and the second access panel simultaneously.

In some embodiments, the first access panel is configured to rotate outwards with respect to the upper platform, and the second access panel is configured to rotate upwards with respect to the upper platform. Other embodiments may use different access panels and/or have different opening orientations relative to the upper platform. Unlocking the locking mechanism 130 may unlock both the first access panel and the second access panel. The locking mechanism 130 may be coupled to the upper platform 150.

Figure 3:
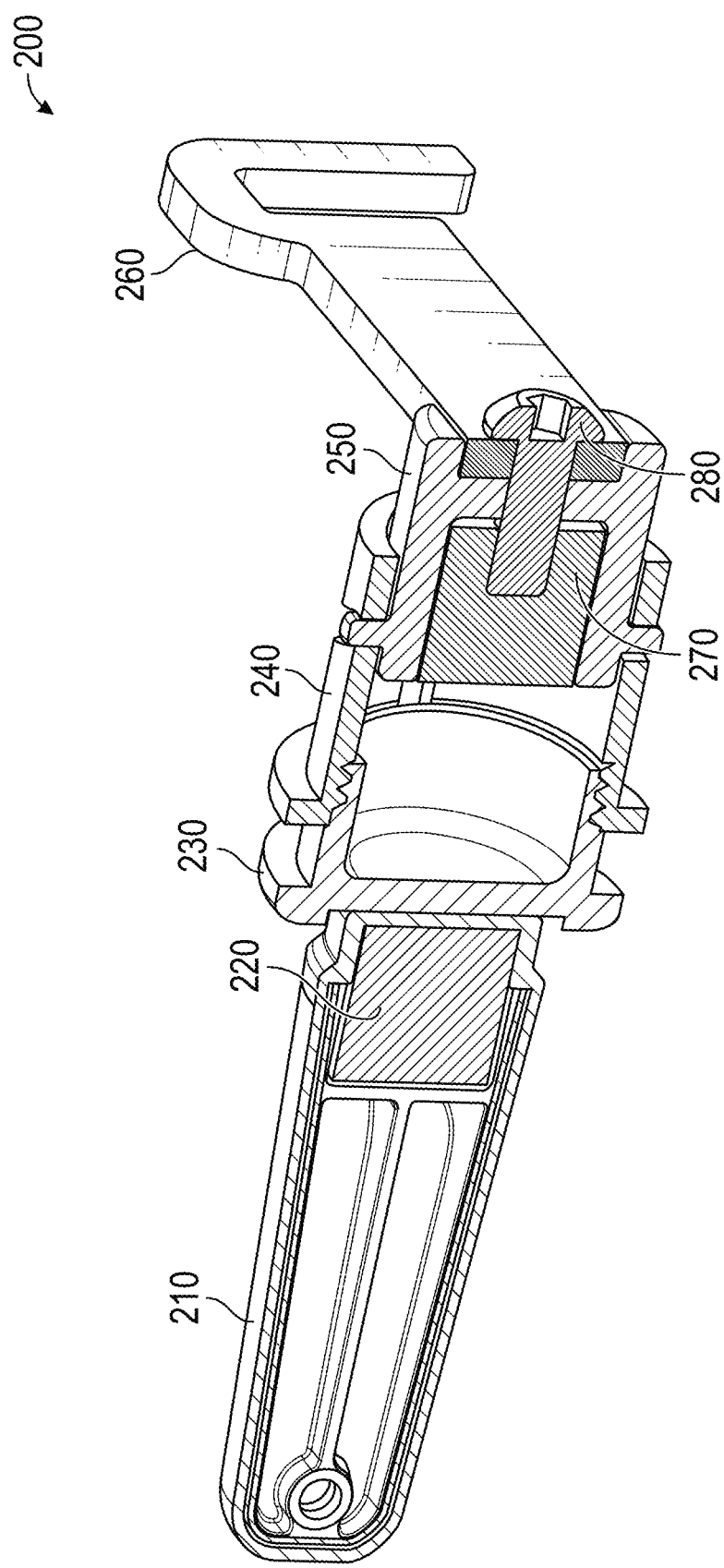
FIG. 3 is a schematic cross-sectional illustration of an example magnetic locking mechanism to secure multiple cart components in accordance with one or more embodiments of the disclosure.
Figure 4:
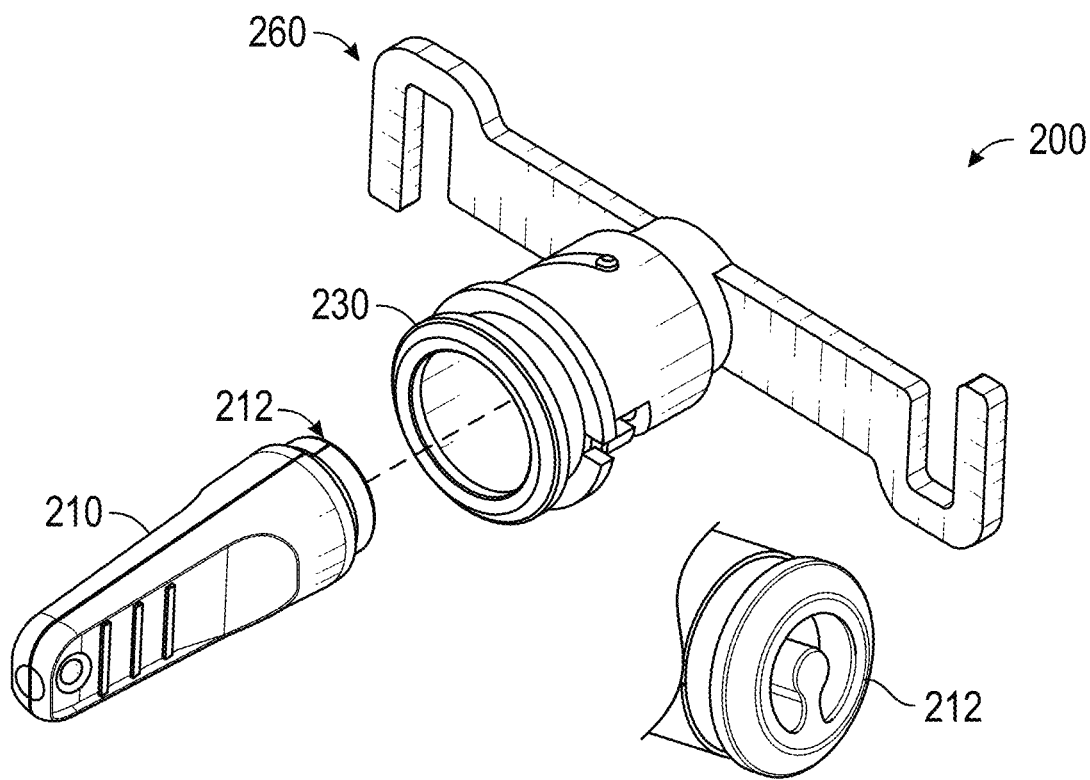
FIGS. 4-5B are schematic perspective illustrations of the example magnetic locking mechanism to secure multiple cart components of FIG. 3 in accordance with one or more embodiments of the disclosure.

FIG. 3 is a schematic cross-sectional illustration of an example magnetic locking mechanism 200 to secure multiple cart components in accordance with one or more embodiments of the disclosure. FIGS. 4-5B are schematic perspective illustrations of the example magnetic locking mechanism to secure multiple cart components of FIG. 3 in accordance with one or more embodiments of the disclosure. Other embodiments may include additional or fewer components. The illustration of FIGS. 3-5B may not be to scale, and may not be illustrated to scale with respect to other figures.

In FIG. 3, the magnetic locking mechanism 200 may be the locking mechanism 130 of FIGS. 1-2. The magnetic locking mechanism 200 may interact with a key fob 210 to lock and unlock the magnetic locking mechanism 200. The key fob 210 may include a body and a first magnet 220.

The magnetic locking mechanism 200 may include a bezel 230, a body 240, a piston 250, a spring 252, a cam 260, a second magnet 270, and a screw 280. The bezel 230 may be coupled to the body 240. In some embodiments, the bezel 230 may not rotate with respect to the body 240. The piston 250 may be configured to rotate inside the body 240. The piston 250 may include one or more protrusions that engage a groove or slot 290 formed along the body 240, where the groove or slot may guide axial movement of the piston 250 inside the body 240. The piston 250 may move axially inside the body 240 during unlocking or locking of the locking mechanism 200. The cam 260 may be a double cam, and may include one or more hooks. For example, the cam 260 may include a first hook that engages the first access panel, and a second hook that engages the second access panel. The cam 260 may be configured to rotate when the magnetic locking mechanism 200 is locked or unlocked. The hooks of the cam 260 may engage corresponding protrusions on the hatch 110 and door 120 to secure the hatch 110 and door 120. The screw 280 may be configured to couple the double cam 260 to the piston 250.

The magnetic locking mechanism 200 may include the second magnet 270, which may be a lock magnet. The piston 250 with the second magnet 270 may be configured to slide inside the body 240 from a first position to a second position, where the lock magnet engages the screw 280 at the first position, as shown in the cross-sectional view of FIG. 3 (thereby allowing the cam to rotate from a vertical locked position to a horizontal unlocked position). The lock magnet may disengage the screw 280 at the second position. The locking mechanism 200 cannot be unlocked when the lock magnet is in the first position in some embodiments.

The key fob 210 may be configured to engage the locking mechanism 200, and the key fob may include the first magnet 220, where the first magnet 220 is configured to move the lock magnet 270 to the second position.

As depicted in FIG. 4, the bezel 230 may have a face 212 with one or more geometric features that facilitates engagement of the key fob 210, and the key fob 210 may have corresponding geometric feature(s) on the face 212 that engage with the features on the face of the bezel 230.

Figure 5A:
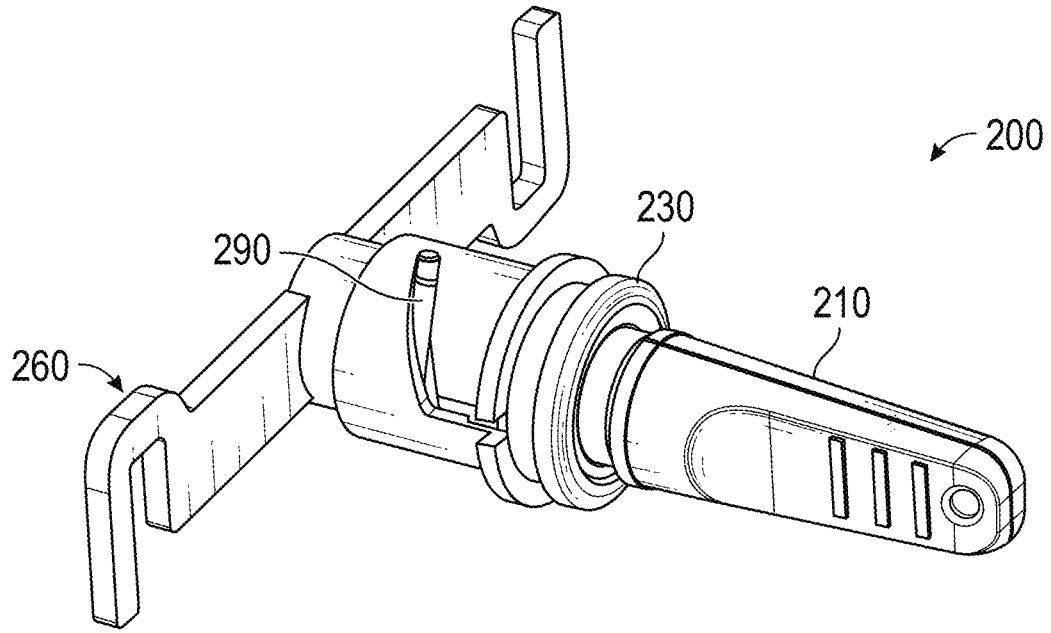
Figure 5B:
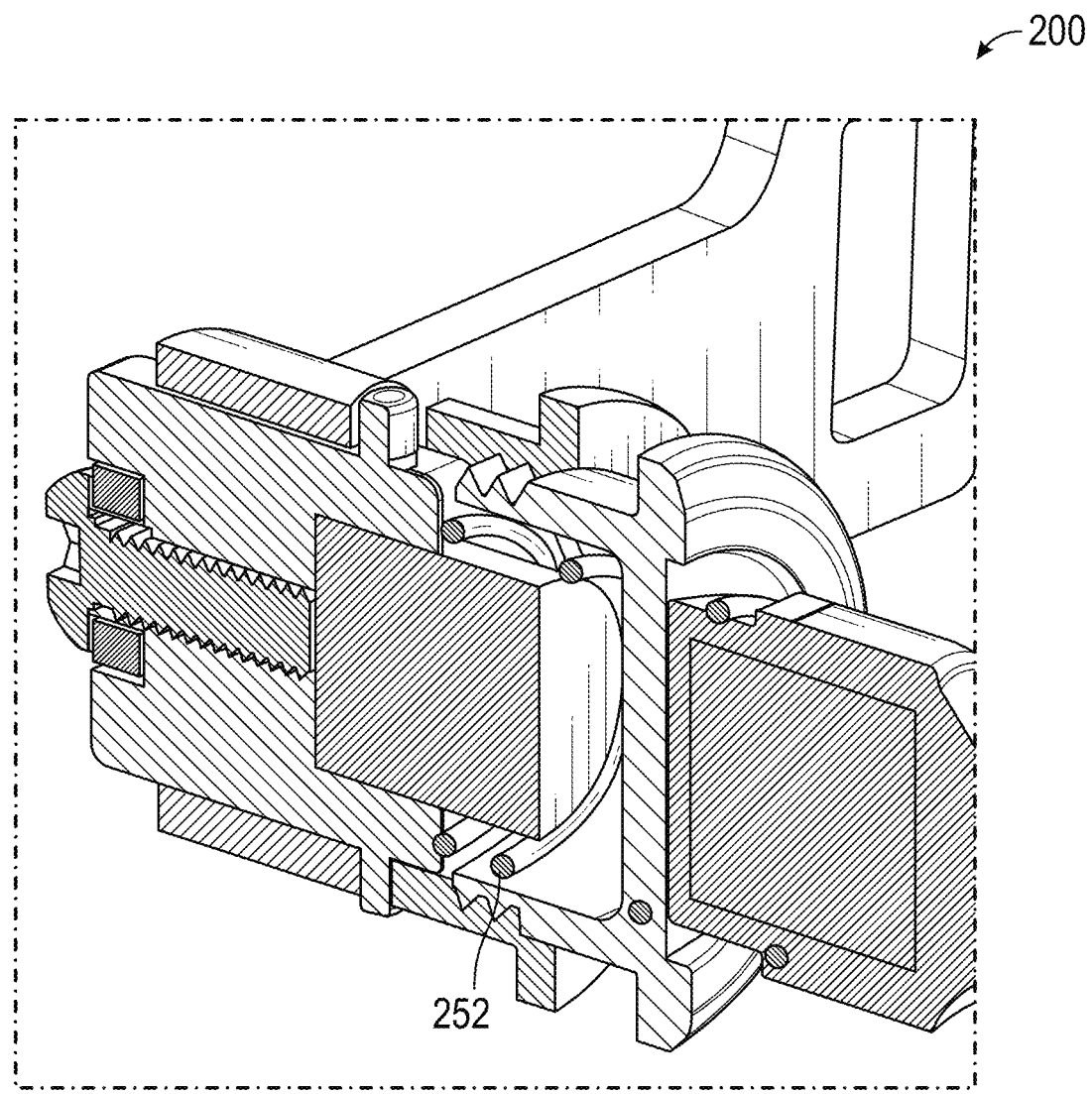

As depicted in FIGS. 5A-5B, when the key fob 210 is engaged with corresponding opening in the bezel 230, the first magnet 220 inside key fob 210 attracts the second magnet 270 (e.g., the lock magnet), allowing the piston 250 to ride in the path cutout on the body 240 as the spring 252 located between the bezel 230 and the second magnet 270 compresses, which rotates the cam 260 from a vertical position to a horizontal position (which is unlocking position). When the key fob 210 is removed, the cam 260 rotates back in vertical position (which is the locking position) as the second magnet 270 is pushed forward due to spring force of spring 252. Accordingly, the key fob 210 may not have to be rotated in order to lock or unlock the locking mechanism 200.

Figure 6:
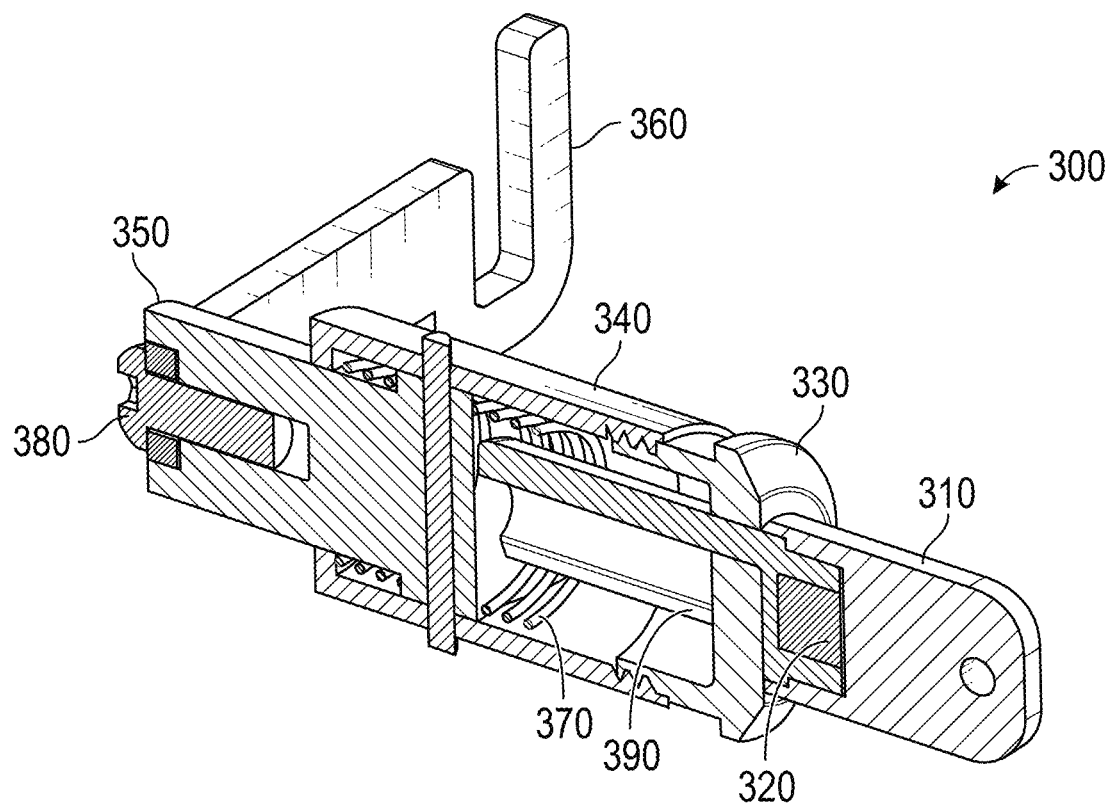
FIG. 6 is a schematic cross-sectional illustration of an example mechanical locking mechanism to secure multiple cart components in accordance with one or more embodiments of the disclosure.
Figure 7:
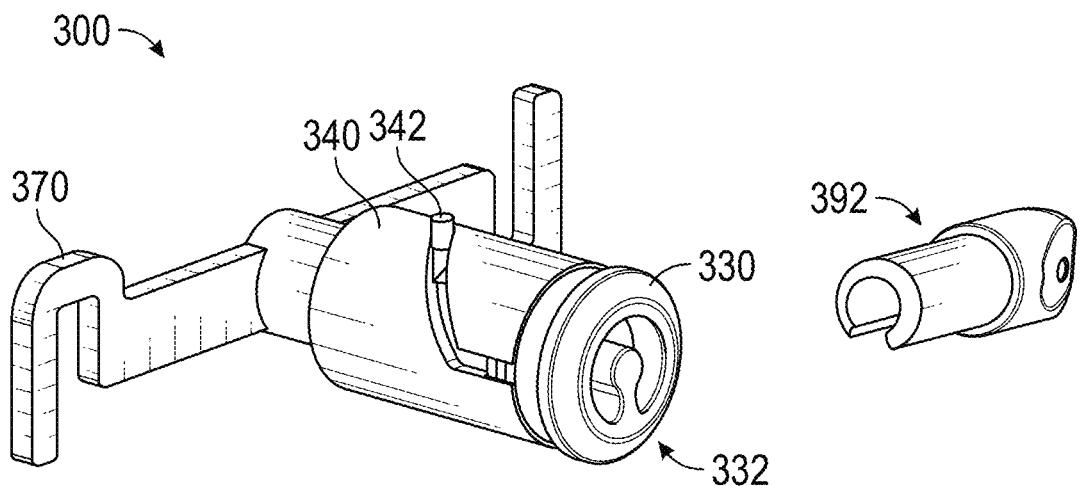
FIG. 7 is a perspective view of the example mechanical locking mechanism of FIG. 6 in accordance with one or more embodiments of the disclosure.

FIG. 6 is a schematic cross-sectional illustration of an example mechanical locking mechanism 300 to secure multiple cart components in accordance with one or more embodiments of the disclosure. FIG. 7 is a perspective view of the example mechanical locking mechanism of FIG. 6 in accordance with one or more embodiments of the disclosure. Other embodiments may include additional or fewer components. The illustration of FIGS. 6-7 may not be to scale, and may not be illustrated to scale with respect to other figures.

The mechanical locking mechanism 300 may be the locking mechanism 130 of FIGS. 1-2. The mechanical locking mechanism 300 may interact with a key fob 310 to lock and unlock the mechanical locking mechanism 300. The key fob 310 may include a body and a first magnet 320.

The mechanical locking mechanism 300 may include a bezel 330, a body 340, a piston 350, a cam 360, a spring 370, and a screw 380. The bezel 330 may be coupled to the body 340. In some embodiments, the bezel 330 may not rotate with respect to the body 340. The piston 350 may be configured to rotate inside the body 340. The piston 350 may include one or more protrusions 342 that engage a groove or slot formed along the body 340, where the groove or slot may guide axial movement of the piston 350 inside the body 340. The piston 350 may move axially inside the body 340 during unlocking or locking of the locking mechanism 300. The cam 360 may be a double cam, and may include one or more hooks. For example, the cam 360 may include a first hook that engages the first access panel, and a second hook that engages the second access panel. The cam 360 may be configured to rotate when the magnetic locking mechanism 300 is locked or unlocked. The hooks of the cam 360 may engage corresponding protrusions on the hatch 110 and door 120 to secure the hatch 110 and door 120. The screw 380 may be configured to couple the double cam 260 to the piston 250.

The mechanical locking mechanism 300 may include the spring 370, which may bias the piston 350 towards a front of the mechanical locking mechanism 300.

The key fob 310 may be configured to engage the locking mechanism 300, and the key fob may include the first magnet 320, where the first magnet 320 is configured to attract the key fob 310 to the spring 370.

As depicted in FIG. 7, the bezel 330 may have a face 332 with one or more geometric features that facilitates engagement of the key fob 310, and the key fob 310 may have corresponding geometric feature(s) 392 that engage with the features on the face 332 of the bezel 330. A portion 390 of the key fob 310 may extend into the mechanical locking mechanism 300.

When the key fob 310 is engaged with corresponding opening in the bezel 330, the magnet 320 inside the key fob 310 keeps it against the bezel 330 and pushes the piston 350 forward while compressing the spring 370, allowing the piston 350 to ride in the path cutout on cylinder body 340 which rotates cam 360 from vertical position to horizontal (which is the unlocking position). When the key fob 310 is removed, it rotates the cam 360 to the vertical position (which is locking position) as the spring 370 pushes the piston 350 backwards (e.g., towards the bezel 330) into the locking position. The spring 370 may therefore be configured to bias the piston 350 towards the bezel 330.

Example embodiments of the disclosure provide a number of technical features or technical effects. For example, in accordance with example embodiments of the disclosure, certain embodiments of the disclosure may provide the ability to lock and unlock multiple secure areas of a cart at the same time. Some embodiments may perform such locking or unlocking without having to rotate a key fob. The above examples of technical features and/or technical effects of example embodiments of the disclosure are merely illustrative and not exhaustive.

Figure 8A:
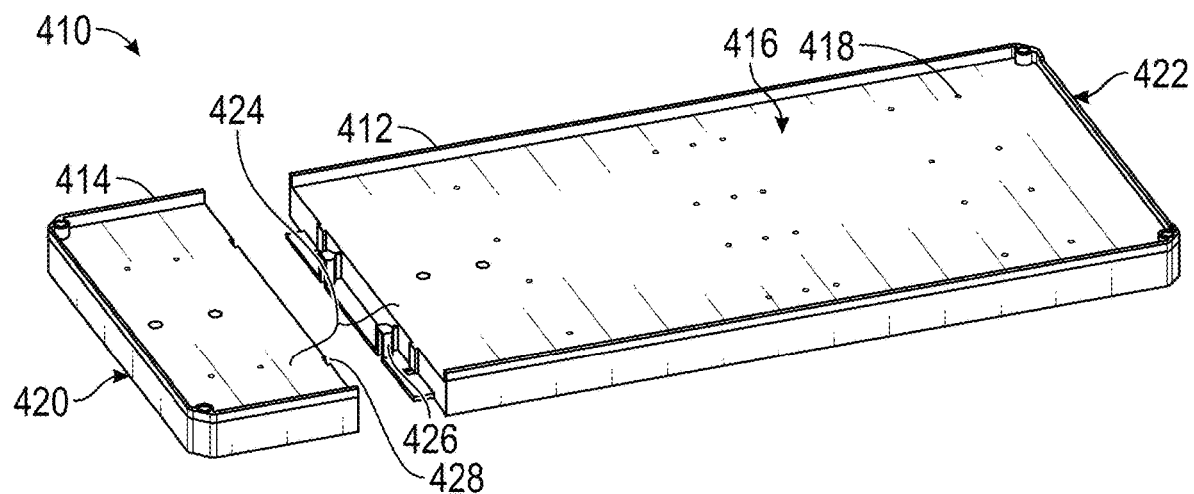
FIG. 8A is a conceptual exploded perspective view of a platform including a platform base and a platform extension for a cart system.

Referring to FIG. 8A, example embodiments include modular cart systems carts, for example, of wheeled carts that can be used to store and transport objects. For example, objects may be placed in the carts, and the carts may be pushed or pulled by a person, or positioned in a predetermined location. The cart systems may be reconfigurable, for example, by adding, removing, or replacing, storage units or containers, to change cart size, capacity, and compactness. In embodiments, a cart system includes a platform defining a top surface. The top surface defines a plurality of openings. The cart system further includes at least one tower secured to the platform by a plurality of fasteners engaged with at least a respective sub-plurality of openings of the plurality of openings. In embodiments, a tool attachment system for a cart system includes at holder slot defined by the least one tower. The tool attachment system further includes at least one tool holder secured to the at least one tower at the at least one holder slot.

The present disclosure describes modular carts that can be used to store or transport objects, and which are reconfigurable. In embodiments, carts according to the present disclosure may include removable and repositionable towers and tool holders. The towers and holders may allow carrying of accessories, supplies, devices, or smaller items on the cart, and placement of carried objects at different locations on the cart. Thus, a user may beneficially configure carts as per their workflow needs. Conventional tool holders may generate noise as the cart is moved. The cart systems may be provided with tool holders to retain different tools and items on the carts, when the cart is static or in motion. The holders may aid in reduction of noise. The holders may be secured to one or more of side panels, top panels, handle areas, for example, at openings to hold different tool holders with attachment feature to engage with carts opening.

In embodiments, a cart system includes a platform defining a top surface. The top surface defines a plurality of openings. The cart system further includes at least one tower secured to the platform by a plurality of fasteners engaged with at least a respective sub-plurality of openings of the plurality of openings.

In embodiments, a tool attachment system for a cart system includes a holder slot defined by the least one tower. The tool attachment system further includes at least one tool holder secured to the at least one tower at the at least one holder slot.

Figure 8B:
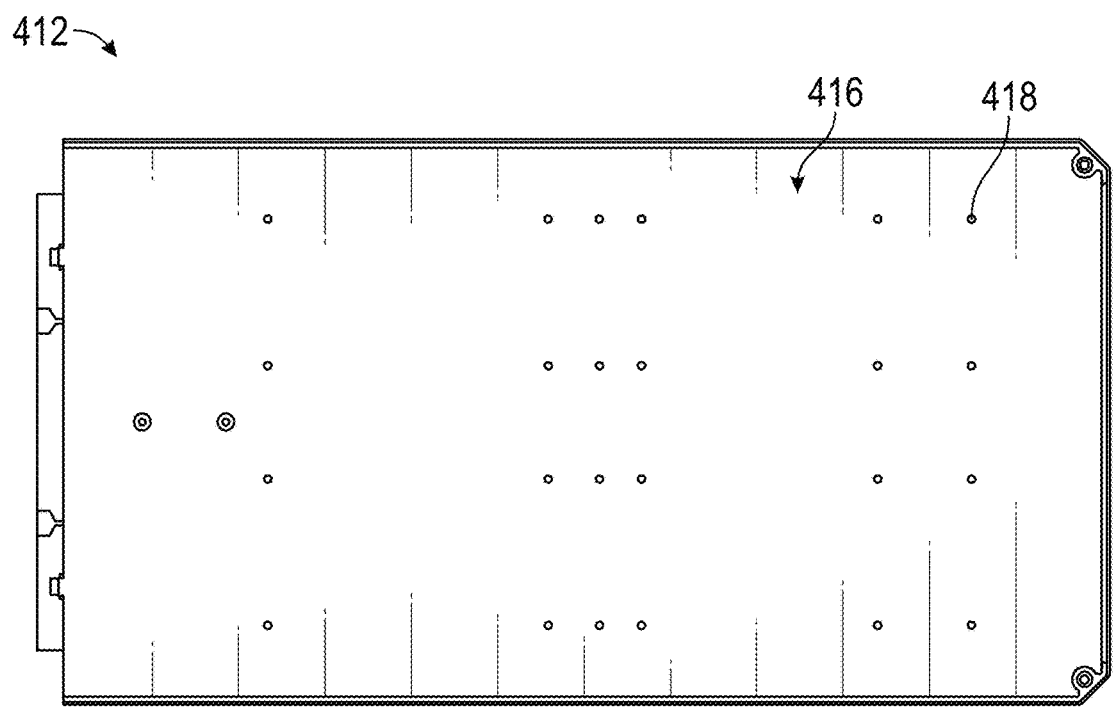
FIG. 8B is a top view of the platform base of FIG. 8A.

FIG. 8A is a conceptual exploded perspective view of a platform 410 including a platform base 412 and an optional platform extension 414 for a cart system (not shown in FIG. 8B). FIG. 8B is a top view of the platform base 412 of FIG. 8A. The platform 410 may be formed of any suitable rigid material, for example, a plastic, a metal or an alloy, or a composite material. The platform 410 defines a top surface 416.

The top surface 416 defines a plurality of openings 418. The openings 418 are configured to receive fasteners to secure components of a cart system to the platform 410, or to receive portions of the components of the cart system. The components can be secured to, removed from, or otherwise rearranged on one or more openings 418, thus providing modularity to a cart system including the platform 410.

In embodiments, the plurality of openings 418 are arranged in a grid, or any suitable pattern. The grid may include equally or uniformly spaced openings 418, or may include a non-uniform spacing. The openings 418 may be arranged as square, rectangular, hexagonal, or any other polygonal vertex pattern. In some embodiments, the grid may include any predetermined pattern for disposing openings 418 along the top surface 416 of the platform 410. In some embodiments, the grid includes a uniform inter-opening spacing between respective openings 418 in a direction transverse to the platform, for example, as shown in FIGS. 8A and 8B. In some embodiments, the plurality of openings 418 may extend to closed channels defined in bosses extending downward from a bottom of the platform 410. In other embodiments, the plurality of openings extend to open channels 18 defined in bosses extending downward from a bottom of the platform.

The openings 418 may have any suitable peripheral contour, for example, circular, oval, curved, square, polygonal, or a complex shape. In embodiments, the openings 418 have a circular edge. In embodiments, the openings 418 may each have substantially the same size, for example, a same average width or diameter. In embodiments, the openings 418 may each have the same shape. In other embodiments, sub-pluralities of the openings 418 may differ in size or shape. For example, some of openings 418 may be sized and/or shaped to receive one type of fastener or attachment means, and others of openings 418 may be sized and/or shaped to receive another type of fastener or attachment means.

When the platform extension 414 is present, the platform extension 414 may be laterally secured to the platform base 412. In some such embodiments, the platform extension 414 is secured to the platform base by at least one dovetail joint 424. The dovetail joint 424 may be formed by a dovetail 426, for example, defined by platform 412, and a slot 428, for example, defined by platform extension 414.

The platform 410 extends from a platform front 420 to a platform rear 422. While the platform front 420 may be defined by an edge of platform extension 414 as shown in FIG. 8A, in other embodiments in which platform extension 414 is absent, the platform front 420 may be defined by an edge of platform base 412 opposing an edge forming a platform rear 422.

Figure 9:
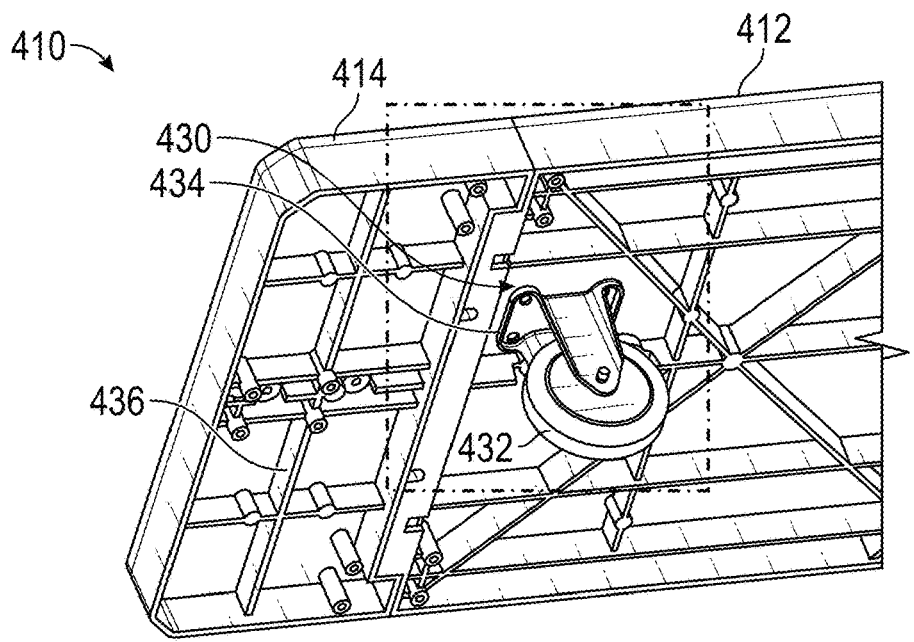
FIG. 9 is a conceptual partial bottom exploded perspective view of the platform of FIG. 8A further including a wheel assembly.

FIG. 9 is a conceptual partial bottom exploded perspective view of the platform 410 of FIGS. 8A-8B further including a wheel assembly 430. The wheel assembly 430 may include a wheel 432 secured to a wheelbase 434. The wheelbase 434 may be secured to the platform 410, for example, by fasteners, adhesive, friction fit, or any suitable securement means. In embodiments, the platform extension 414 is secured to the platform base 412 by the wheel assembly 430. For example, one portion of the wheel assembly 430 may be secured to the platform base 412, and another portion of the wheel assembly 430 may be secured to the platform extension 414, thus bridging platform base 412 and platform extension 414.

In embodiments, the platform 410 further defines a plurality of reinforcing ribs 436 extending along a bottom of the platform 410, as seen in FIG. 9. The reinforcing ribs 436 may redistribute load along the platform 410, so that platform 410 evenly bears a load on a cart system including the platform 410.

Figure 10:
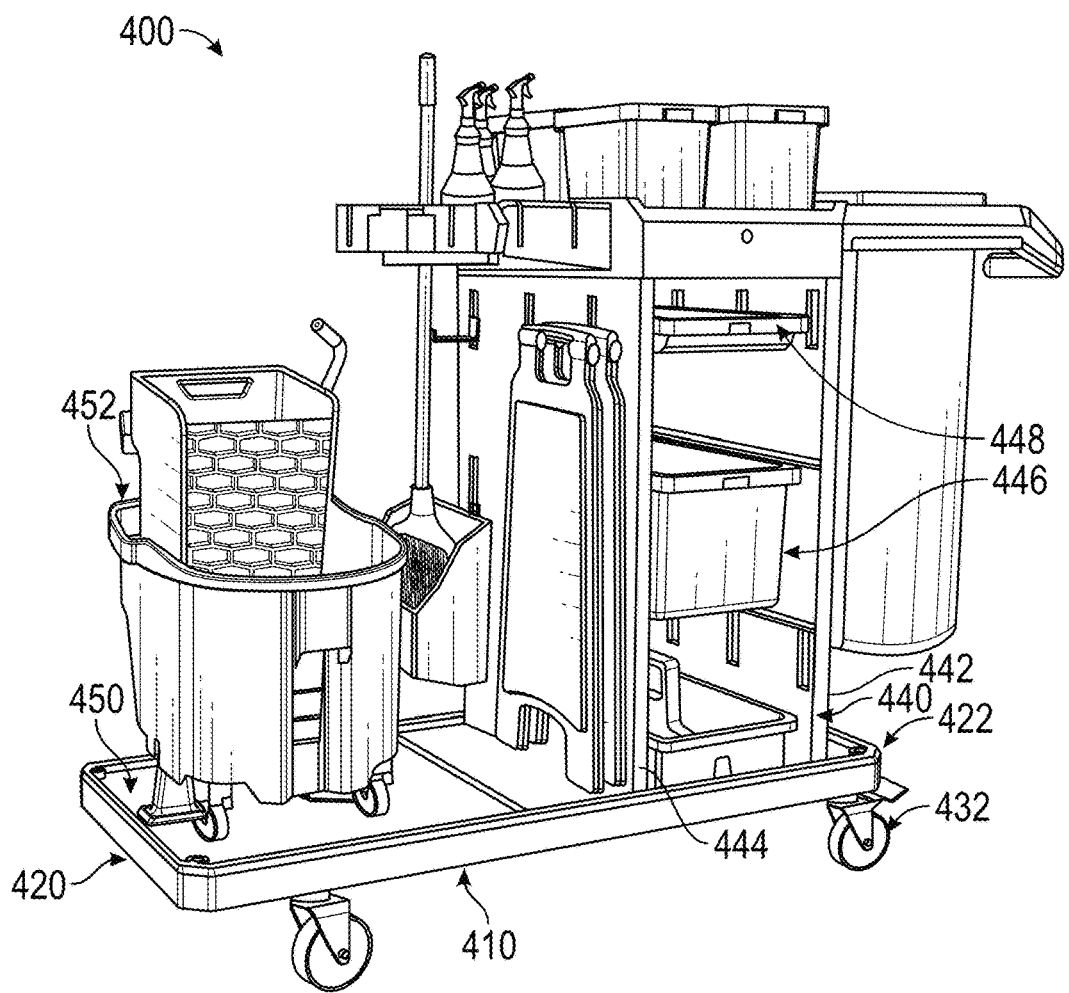
FIG. 10 is a conceptual perspective view of a cart system including the platform of FIG. 8A and a tower secured to the platform.

FIG. 10 is a conceptual perspective view of a cart system 400 including the platform 410 of FIG. 8A, and a tower 440 secured to the platform 410. The cart system 400 may include one, two, or more towers such as the tower 440. The tower 440 is secured to the platform 410 by a plurality of fasteners engaged with at least a respective sub-plurality of openings of the plurality of openings 418. For example, the tower 440 may be secured to two or more, but less than all, of the plurality of openings 418. In some embodiments, the tower 440 may be secured to all of the openings 418. In embodiments, the sub-plurality of openings is a first sub-plurality of openings configured to engage with the tower 440, and the top surface 416 further defines a second sub-plurality of openings. In some such embodiments, the cart system 400 includes a first tower and a second tower, the sub-plurality of openings is a first sub-plurality of openings configured to engage with the first tower, and the top surface further defines a second sub-plurality of openings configured to engage with the second tower.

The tower 440 may defines an interior volume configured to receive at least one storage bin 446. In some embodiments, the tower 440 further includes an interior tray 448.

The fasteners may include screws, clips, tabs, or any suitable fastening bodies. In embodiments, the fasteners may not be units distinct from the tower 440, and may instead be defined by integral or unitary protrusions, portions, or extensions from the tower 440. The tower 440 may be positioned (1) adjacent the platform front 420, (2) adjacent the platform rear 422, or (3) anywhere between the platform front 420 and the platform rear 422.

In embodiments, the tower 440 includes at least one side panel 442 secured to the platform. The side panel 442 may extend in a direction along the platform 410 (not shown in FIG. 10), or in a direction transverse to platform 410 (as shown in FIG. 10). In embodiments, the cart system 400 may include a first side panel (for example, side panel 442) and a second side panel 444. The tower 440 may include at least two side panels, no more than two side panels, or exactly two side panels.

In embodiments, the cart system 400 may include a plurality of wheels 432 secured to a bottom of the platform 410. Thus, the cart system 400 may be easily transportable and movable. The cart system 400 may be used to hold and transport one or more items. The items may be held in or on one or both of the platform 410 and the tower 440.

In embodiments, the platform 410 defines a stowage region 450 adjacent the tower 440, the stowage region 450 being configured to carry at least one item 452. The item 452 may include one or more open or closed containers for dry goods or material, or for liquids, such as a bucket, a bag, or a bin. The item 452 may also include accessories or supplies, for example, for cleaning, maintenance, or utilities.

In some such embodiments, the stowage region 450 may merely present a flat surface to hold and carry the item 452. In other embodiments, a retaining or securing means may be present at the stowage region 450 to removably retain or secure the item 452. For example, the stowage region 450 may include a frame or a wire-form retainer for securing the item 452.

Because the platform 410 includes a plurality of openings 418, the tower 440, and the stowage region 450, may be reconfigured by removing, repositioning, or attaching, the tower 440 at any predetermined location along the platform 410. In embodiments, the cart system 400 may include user repositionable fasteners, so that an end-user or consumer may reconfigure the cart system 400. In other embodiments, the cart system 400 may only include factory- or manufacturer-accessible or removable fasteners, such that the cart system 400 can only be initially custom configured before shipping to a user. In some such embodiments, the user may not be able to reconfigure the cart system 400 readily.

The cart system 400 may include further components or variants, as described in the present disclosure.

FIG. 11 is a conceptual perspective view of a cart system 1300 including the platform 410 of FIG. 8A, a bucket retention tool 1302, and an intermediate position of a bucket 1304 being placed on the platform 410. FIG. 12 is a conceptual perspective view of the bucket retention tool 1302 of the cart system 1300 of FIG. 11 including a riser 1306 extending from a base 1310. FIG. 13 is a conceptual perspective view of the cart system 1300 of FIG. 11, in a final configuration with the bucket 1304 secured to the bucket retention tool 1302.

In embodiments, the stowage region 1350 includes the bucket retention tool 1302 including at least one riser 1306, the riser 1306 protruding upward from the platform 410 and configured to be slidably received in a slot 208 defined by a bucket 1304 to secure the bucket 1304 to the stowage region 1350. In some embodiments, the bucket retention tool 1302 includes at least two risers. In some embodiments, as shown in FIGS. 11 and 13, the bucket retention tool 1302 consists of two risers spaced along a direction from a platform front to a platform rear. In some such embodiments, the two risers secure the bucket 1304 in a direction transverse to the platform 410. The riser 1306 may be secured to the platform 410 by a tab, or by one or more fasteners. In some embodiments, the at least one riser 1306 is secured to one or more of openings 418 defined in the platform 410, for example, by fasteners. In some such embodiments, the base 1308 of the bucket retention tool 1302 may be secured to one or more of openings 418. In other such embodiments, the base 1308 of the bucket retention tool 1302 may be secured to other openings, for example, openings extending from a bottom or a top of the platform 410, or extending through a thickness of the platform 410.

Figure 14:
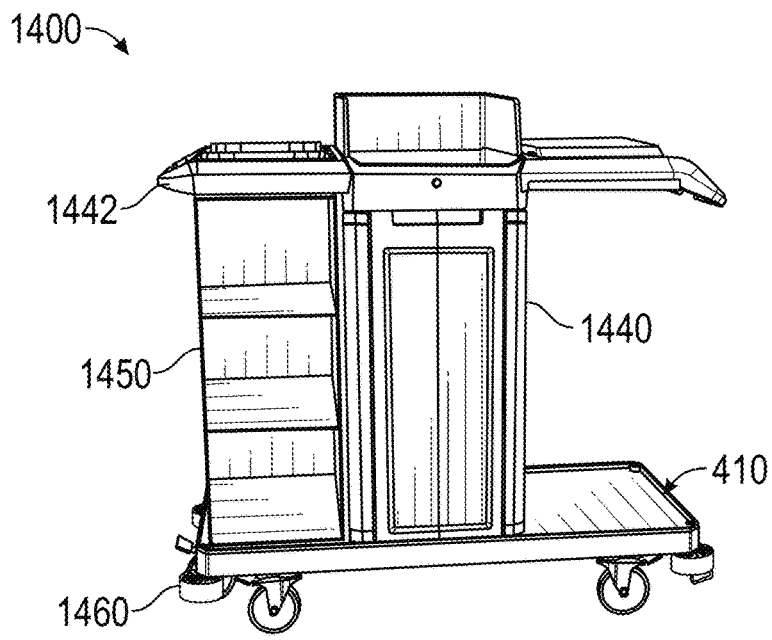
FIG. 14 is a conceptual perspective view of a cart system including the platform of FIG. 8A, a tower, and a multi-compartment bag.

FIG. 14 is a conceptual perspective view of a cart system 1400 including the platform 410 of FIG. 8A, a tower 1440, and a multi-compartment bag 1450. The tower 1440 may be substantially similar to the tower 440 described with reference to the preceding figures. In some embodiments, the tower 1440 may include a rim 1442, and the multi-compartment bag 1450 may be secured to the rim 1442. The rim 1442 may be integral or unitary with a portion of tower 1440, or may constitute a distinct unit secured to the tower 1440. In embodiments, the tower 1440 includes at least one door 1444. In embodiments, the cart system 1400 includes a plurality of bumpers 1460 secured to the platform.

Figure 15:
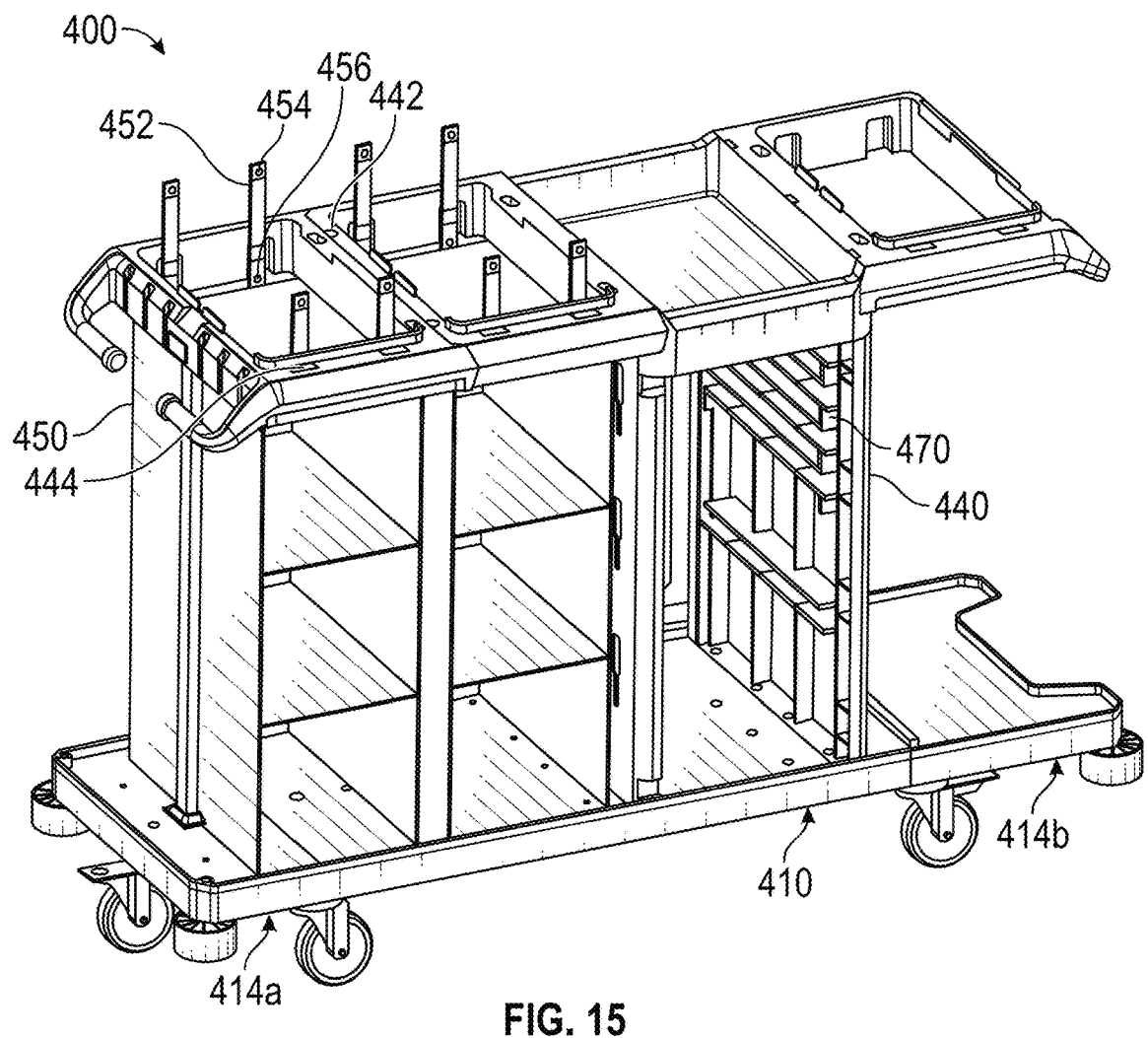
FIG. 15 is a conceptual perspective view of a cart system including a platform, a tower, and further including platform extensions at the front and rear of the platform, and two multi-compartment bags.

FIG. 15 is a conceptual perspective view of an alternate embodiment of the cart system 400 including the platform 410, a tower 440, and further including platform extensions 414a and 414b at the front and rear of the platform 410, and two multi-compartment bags 450. The platform 410 may be substantially similar to the platform 410 described with reference to the preceding figures, except for the additional extension.

The tower 440 may be substantially similar to the tower 440 described with reference to the preceding figures, but with certain differences. For example, the tower 440 defines a rim 442 defining a plurality of strap slots 444, and to which the multi-component bags 450 are secured. The rim 442 may be integral or unitary with a panel of the tower 440, or may constitute a distinct rim secured to the tower 440.

In embodiments, the multi-compartment bags 450 define compartment openings facing outward along a side of the platform 410.

The multi-compartment bags 450 may be coupled to a plurality of straps 452, and the bags 450 may be secured to the tower 440 by engagement of the plurality of straps 452 through the plurality of strap slots 442. In some embodiments, the plurality of straps 452 include respective first snap button portions 454, and a plurality of second snap button 456 portions configured to engage with the first snap button 454 portions to secure the straps 452 about the rim 442 of the tower 440.

Figure 16:
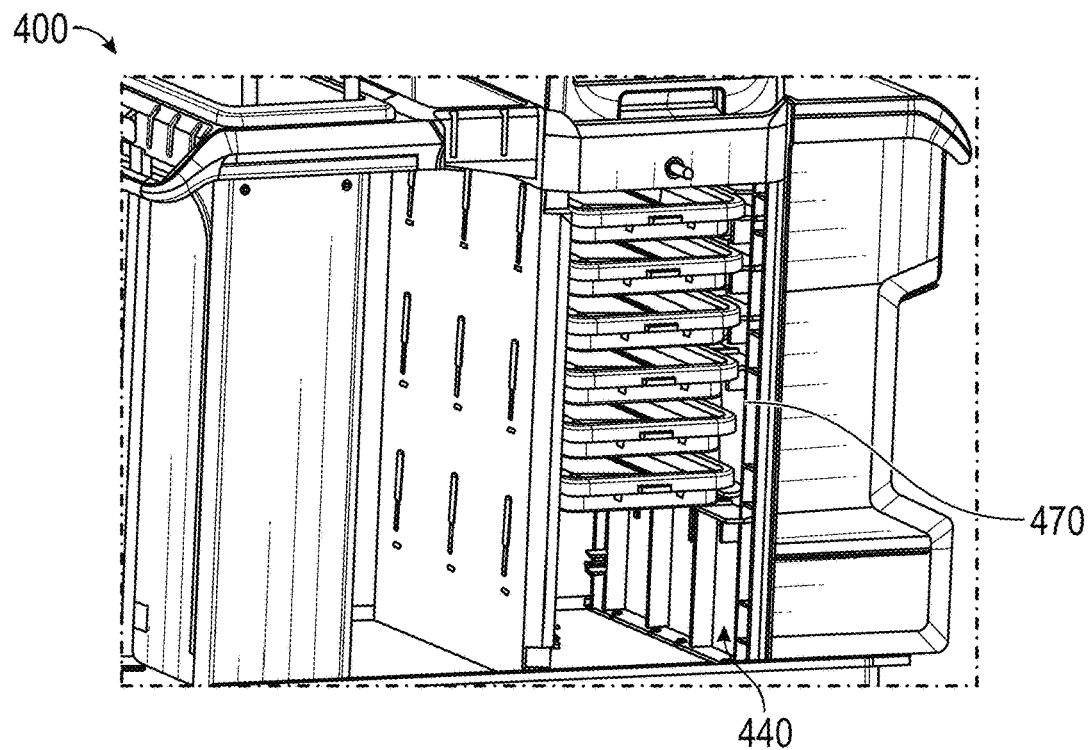
FIG. 16 is a conceptual partial perspective view of the cart system of FIG. 15 with the multi-compartment bags remove, and the tower including a plurality of railings for supporting a plurality of trays.
Figure 17:
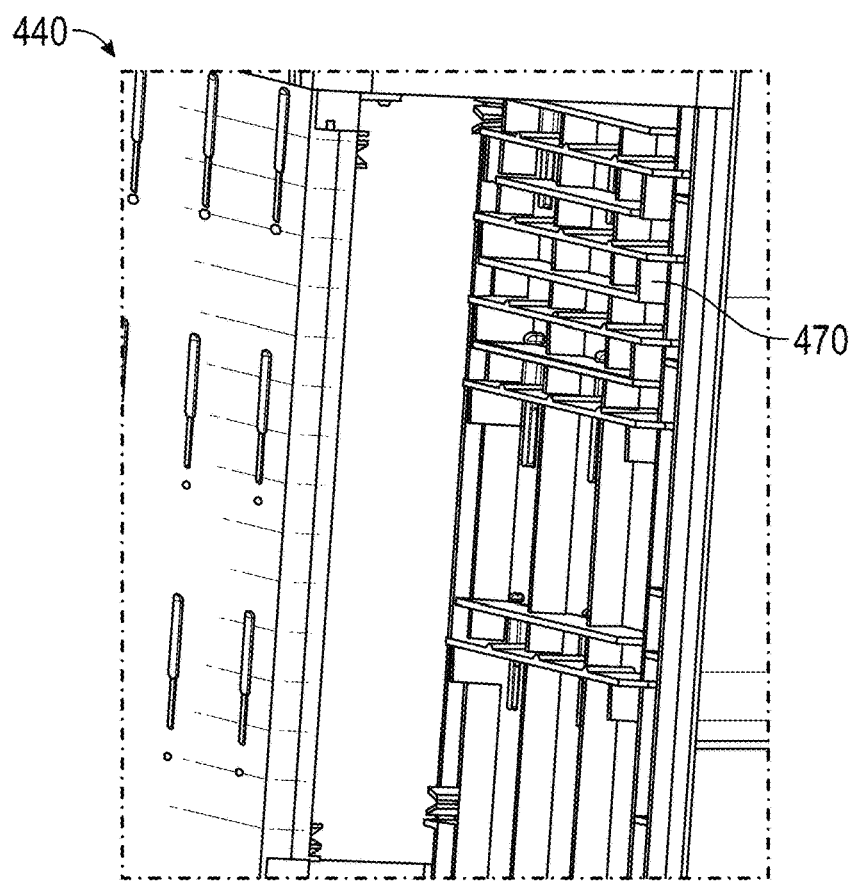
FIG. 17 is a conceptual partial view of the cart system of FIG. 16 without the trays.

FIG. 16 is a conceptual partial perspective view of the cart system 400, with the multi-compartment bag removed, and the tower 440 including a plurality of railings 470 for supporting a plurality of trays 472. FIG. 17 is a conceptual partial view of the cart system 400 of FIG. 16 without the trays.

As seen in FIGS. 16 to 17, the tower 440 defines opposing pluralities of railings 470 along interior opposing vertical surfaces, wherein the railings are configured to slidably receive at least one bin or tray 472. In embodiments, at least one railing of the pluralities of railings 470 defines a plurality of bumps configured to engage with the at least one bin or tray 472 during sliding of the bin or tray 472 along the at least one railing 470. For example, the bump may provide tactile feedback, or may resist inadvertent removal or fall of bin or tray 472 from the tower 440.

The cart systems according to the present disclosure may be used to hold one or more tools. The present disclosure describes tool holder systems for holding tools on cart systems. Tool holders may be secured to one or more components of cart systems, for example, to towers secured to platforms. In some embodiments, a tower may define a holder slot to which a tool holder may be secured.

FIG. 18 is a conceptual rear perspective view of a tool holder 500 including an elastomeric member 502 for use with a cart system including a tower including a holder slot. The elastomeric member 502 may include any natural or artificial elastomeric or flexible material. In embodiments, the elastomeric member 502 is secured across a rigid base 504. The elastomeric member 502 may include thermoplastic elastomer, and the rigid base 504 may include a composite, for example, a composite of glass and a plastic. In embodiments, the rigid base includes a glass-filled polypropylene. The elastomeric member 502 may be overmolded to or over the rigid base 504. The rigid base 504 may have a dovetail 506 to facilitate securing the tool holder 500 to the holder slot of the tower. A tool or a portion of a tool, for example, a handle, or an elongated or hooked portion of a tool, may be retained in a loop formed by the elastomeric member.

FIG. 19 is a conceptual front perspective view of a tool holder 600 including a band 602 for use with a cart system including a tower including a holder slot. FIG. 20 is a conceptual rear perspective view of the tool holder 600 of FIG. 19. The tool holder also includes a rigid base 604 coupled to the band 602. The band 602 may be similar to the elastomeric member 502, but further include a tab 608 configured to be engaged with a slot 610 across the base 604. In other embodiments, the rigid base 604 may define the tab, and the band 602 may define the slot.

In this way, a tool may be retained in a loop formed by the band 602 across the base 604. The base 604 may have a dovetail 606 to facilitate securing the tool holder 600 to the holder slot of the tower.

Figure 25:
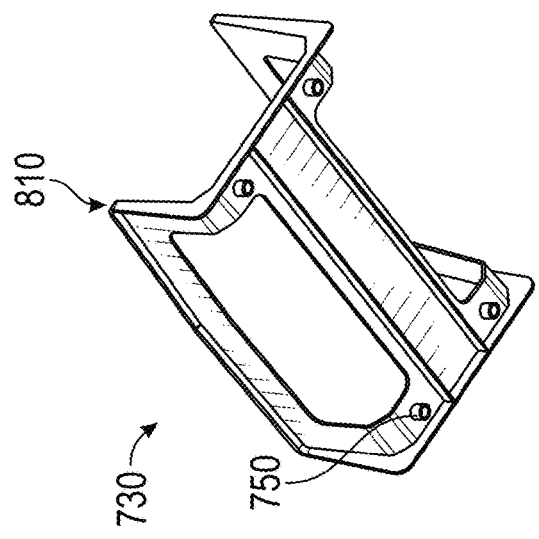
FIG. 25 is a conceptual lower perspective view of the bucket frame of FIG. 21.
Figure 24:
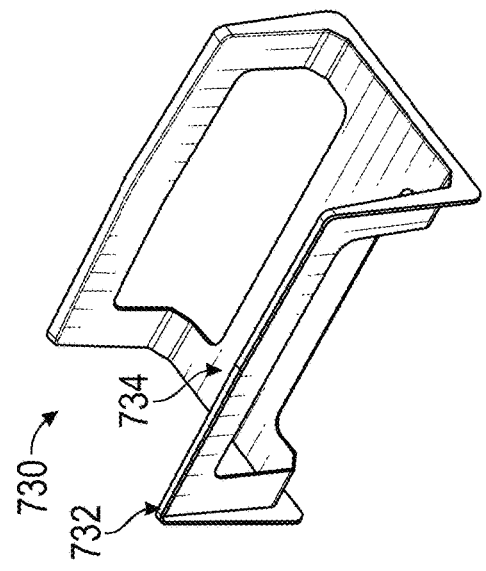
FIG. 24 is a conceptual upper perspective view of the bucket frame of FIG. 21.

FIG. 21 is a conceptual perspective view of a cart system 700 including the platform 410 of FIG. 8A, a container 720 secured to a bucket frame 730, and a tower 740. The tower 740 may be substantially similar to towers described with reference to the preceding figures. FIG. 22 is a conceptual partial perspective view of the cart system 700 of FIG. 21. FIG. 23 is a conceptual partial cross-sectional view of the cart system 700 of FIG. 21. FIG. 24 is a conceptual upper perspective view of the bucket frame 730 of FIG. 21. FIG. 25 is a conceptual lower perspective view of the bucket frame 730 of FIG. 21.

The stowage region 450 of the platform 410 may include the bucket frame 730. The bucket frame 730 may include two risers 732 vertically extending from opposing sides of a base 734. The bucket frame is configured to receive and secure the container 720, for example, a bucket, in contact with the base 734 between the two risers 732. In embodiments, the bucket frame 730 is secured to the platform 410 by fasteners 750.

While a tool holder with a single rigid base is described with reference to FIGS. 21 to 23, in other embodiments, a tool holder may include an elastomeric member or band secured between two rigid bases.

Figure 27:
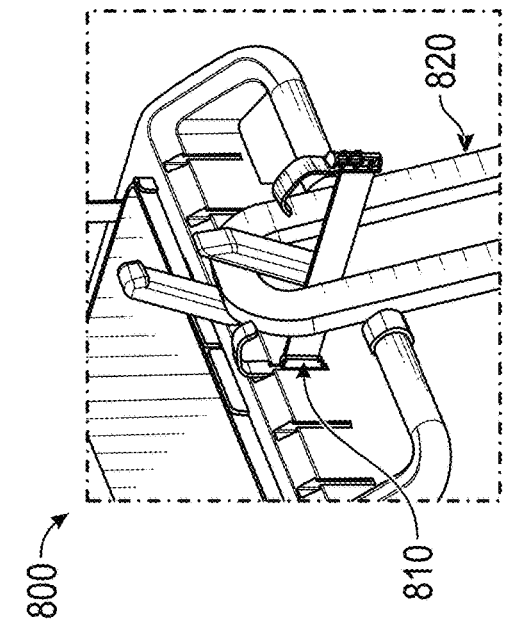
FIG. 27 is a conceptual partial perspective view of a cart system including the vacuum holder of FIG. 26 in a stretched configuration.
Figure 26:
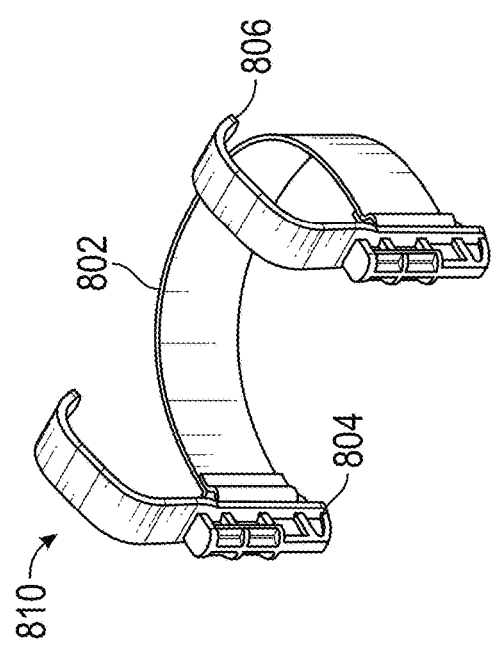
FIG. 26 is a conceptual perspective view of a vacuum holder for use with a cart system.

FIG. 26 is a conceptual perspective view of a vacuum holder 810 for use with a cart system. FIG. 27 is a conceptual partial perspective view of a cart system 800 including the vacuum holder 810 of FIG. 26 in a stretched configuration. The tool holder 810 may include an elastomeric member 802 (similar to elastomeric members 502 or 602), or a strap, for example a textile strap, or a nylon strap. The tool holder 810 includes two rigid bases 804 between which elastomeric member 802 extends. The bases 804 include clips 860. As shown in FIG. 26, in the cart system 800, one of the bases 804 may be secured to the cart system 800, and the elastomeric member 802 or strap extended across a portion of a tool 820. The other base may then also be secured to the cart system 800, so that the portion of the tool 820 is secured to the cart system 800. The operation may be reversed to remove the 820 from the cart system 800.

Figure 28:
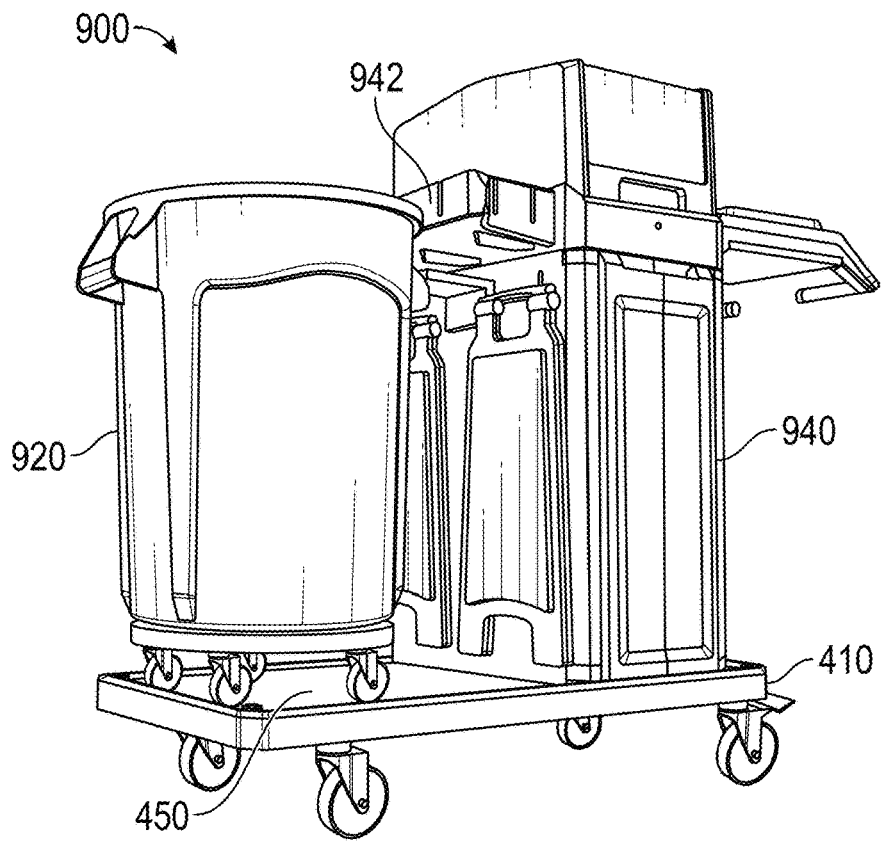
FIG. 28 is a conceptual perspective view of a cart system including the platform of FIG. 8A, a tower, and a waste receptacle.

FIG. 28 is a conceptual perspective view of a cart system 900 including the platform 410 of FIG. 8A, a waste receptacle 920, and a tower 940. The tower 940 may be substantially similar to the towers described with reference to the preceding figures. The waste receptacle 920 may be placed on the stowage region 50 of the platform 410, and secured to a rim 942 of the tower 940. Any suitable fastening means or mechanism may be used to secure the waste receptacle 920 to the tower 940.

Figure 29:
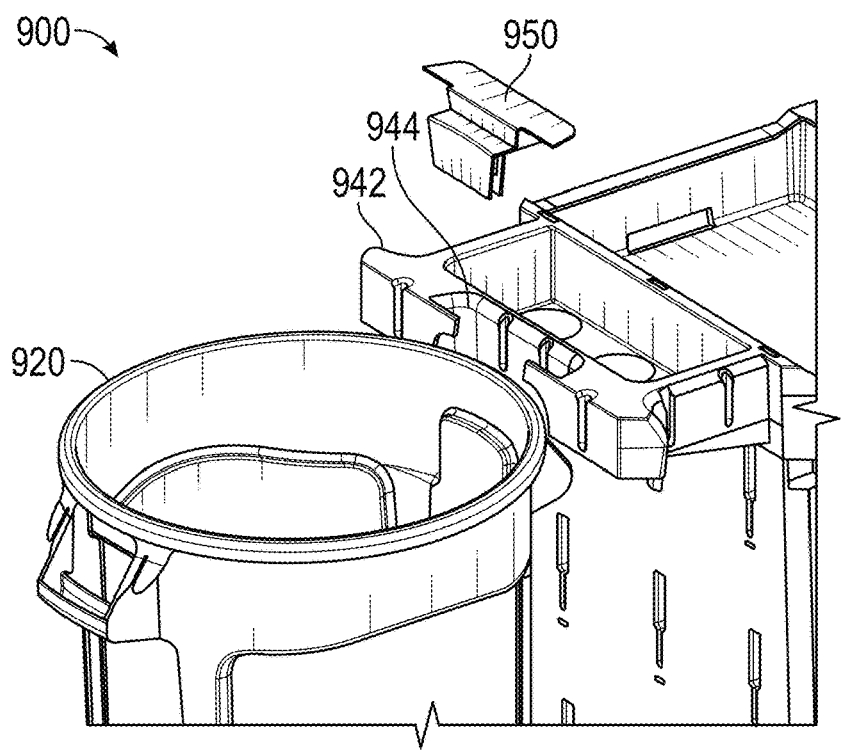
FIG. 29 is a conceptual partial perspective view of the cart system of FIG. 28 including a rim clip.
Figure 30:
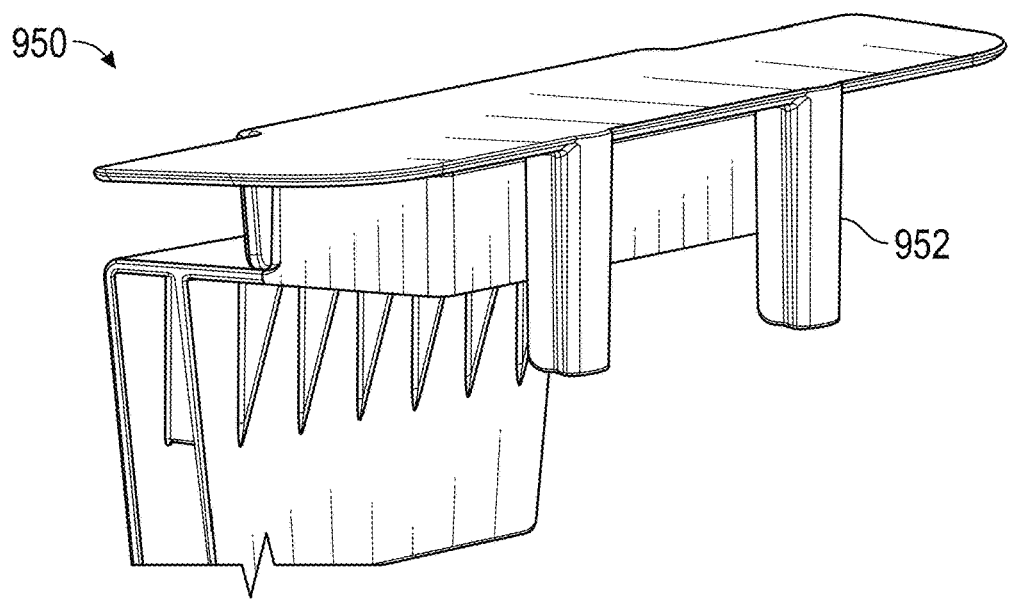
FIG. 30 is a conceptual partial perspective view of the rim clip of FIG. 29.

For example, FIG. 29 is a conceptual partial perspective view of the cart system 900 of FIG. 28 including a rim clip 950. FIG. 30 is a conceptual partial perspective view of the rim clip 950 of FIG. 29. The rim clip 950 is configured to engage a rim of the waste receptacle 920 to secure the waste receptacle on the platform 410 at the stowage region 50. In embodiments, the rim clip 950 comprises at least one pillar 952 slidably engageable with a complementary slot 944 defined by the rim 942 to secure the rim clip 950 across the tower 940 and the waste receptacle 950. Thus, the rim clip 950 may be slidably used to secure or remove the waste receptacle 950 from the cart system 900.

Figure 31:
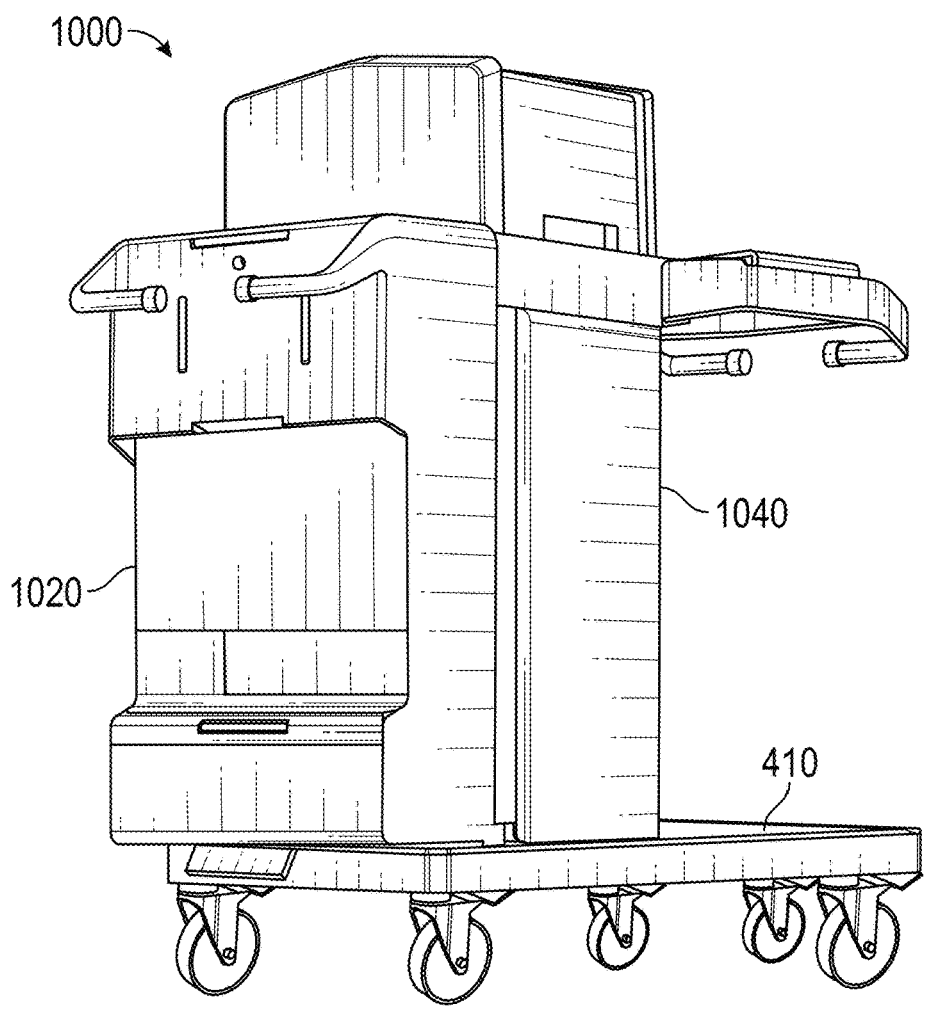
FIG. 31 is a conceptual perspective view of a cart system including the platform of FIG. 8A, a tower, and a dosing system secured to the tower.

FIG. 31 is a conceptual perspective view of a cart system 1000 including the platform 410 of FIG. 8A, a tower 1040, and a dosing system 1020 secured to the tower 1040. The tower 1040 may be substantially similar to the towers described with reference to the preceding figures. The dosing system 1020 may contain a cleaning, utility, or maintenance fluid. A mop, dispenser, spray wand, or some other tool for dispensing, spreading, spraying, or applying the liquid to any desired surface may be held on the cart system 4000. For example, a tool holder may be used in accordance with various embodiments of the disclosure.

FIG. 32 is a conceptual front view of a cart system 1100 including the platform 410 of FIG. 8A, a tower 1140, and a plurality of holder slots 1120 and 1130. FIG. 33 is a conceptual partial perspective view of the cart system 1100 of FIG. 32. FIG. 34 is a conceptual partial top view of the cart system 1100 of FIG. 32.

The holder slots 1120 may be defined in a panel of the tower 1140, for example, a front, rear, or a side panel or surface of the tower 1140. The holder slots 1130 may be defined in a rim 1142. In embodiments, one or both types of slots 1120 or 1130 may be present.

In embodiments, the holder slot 1130 includes a channel extending in a vertical direction across the rim 1142. The channel may have an open end configured to receive a dovetail (for example, of a tool holder). The channel may have a closed end configured to rest against an end of the dovetail.

FIG. 35 is a conceptual perspective view of a tool holder 1210 for use with a tool holder assembly of a cart system. Any tower according to the present disclosure may include at least one tool holder.

FIG. 36 is a conceptual partial perspective view of a tool attachment system 1200 including the tool holder 1210 and a holder slot 1220 and a dimple 1230 defined by a side panel of a tower. In embodiments, the tool attachment system 1200 includes the holder slot 1220 defined by a tower, and the tool holder 1210 secured to the tower at the holder slot 1220.

In embodiments, the tool holder 1210 is engaged with the holder 1220 slot by a dovetail joint. In embodiments, the tool slot 1220 defines a keyhole opening configured to receive a dovetail 1212 (of the tool holder 1210) to form the dovetail joint. In some such embodiments, the dovetail joint faces a rear of the tool holder 1210.

In embodiments, the tool holder 1210 defines a lateral tab 1214 transverse to the dovetail joint. The lateral tab 1214 may resist vertical relative movement between the tool holder 1210 and the holder slot 1220. In such embodiments, the tower may define a lateral dimple 1230 adjacent the (or contiguous with) holder slot 1220 and configured to receive the lateral tab 1210. Thus, the dimple 1230 and the dovetail 1212 may simultaneously engage with the lateral tab 1214 and the holder slot 1220.

In one example embodiment, a cart system comprises: a platform defining a top surface, the top surface defining a plurality of openings; at least one tower secured to the platform by a plurality of fasteners engaged with at least a respective sub-plurality of openings of the plurality of openings. The at least one tower comprises at least one side panel secured to the platform. The platform extends from a platform front to a platform rear, and wherein the at least one side panel extends in a direction along the platform. The platform extends from a platform front to a platform rear, and wherein the at least one side panel extends in a direction transverse to the platform. The at least one side panel comprises a first side panel and a second side panel. In one embodiment, the at least one side panel can optionally consist of the first side panel and the second side panel. In one embodiment, the at least one tower can consist of no more than two side panels. The sub-plurality of openings is a first sub-plurality of openings configured to engage with the at least one tower, and where the top surface further defines a second sub-plurality of openings. The at least one tower comprises a first tower and a second tower, where the sub-plurality of openings is a first sub-plurality of openings configured to engage with the first tower, and where the top surface further defines a second sub-plurality of openings configured to engage with the second tower.

In one embodiment, the platform comprises: a platform base; and a platform extension laterally secured to the platform base. The platform extension is secured to the platform base by at least one dovetail joint. The cart system may include a plurality of wheels secured to a bottom of the platform. The plurality of wheels includes at least one wheel assembly, wherein the platform extension is secured to the platform base by the at least one wheel assembly. The plurality of openings are arranged in a grid. The grid includes a uniform inter-opening spacing between respective openings in a direction transverse to the platform. The cart system may include a handle integral with or secured to the at least one tower. The plurality of openings extend to closed channels defined in bosses extending downward from a bottom of the platform. The plurality of openings extend to open channels defined in bosses extending downward from a bottom of the platform. The platform extends from a platform front to a platform rear, and wherein the at least one tower is positioned (1) adjacent the platform front, (2) adjacent the platform rear, or (3) between the platform front and the platform rear. The cart system may include a plurality of bumpers secured to the platform. The platform further defines a plurality of reinforcing ribs extending along a bottom of the platform. The at least one tower defines an interior volume configured to receive at least one storage bin. The at least one tower further comprises an interior tray. The at least one tower further comprises at least one door. The at least one tower further comprises at least one tool holder. The platform defines a stowage region adjacent the at least one tower, wherein the stowage region is configured to carry at least one item. The stowage region comprises a wire-form retainer for securing the at least one item. The at least one item comprises a bucket or a bin. The at least one tower comprises a rim clip configured to engage a rim of a waste receptacle to secure the waste receptacle on the platform at the stowage region. The rim clip comprises at least one pillar slidably engageable with a complementary slot defined by the at least one tower to secure the rim clip across the at least one tower and the waste receptacle. The stowage region comprises a bucket retention tool comprising at least one riser, the riser protruding upward from the platform and configured to be slidably received in a slot defined by a bucket to secure the bucket to the stowage region. The bucket retention tool consists of two risers spaced along a direction from a platform front to a platform rear, and wherein the two risers secure the bucket in a direction transverse to the platform. The at least one riser is secured to openings defined in the platform by fasteners. The stowage region comprises a bucket frame comprising two risers vertically extending from opposing sides of a base, wherein the bucket frame is configured to receive and secure a bucket in contact with the base between the two risers. The bucket frame is secured to the platform by fasteners. The at least one tower defines a rim defining a plurality of strap slots, and wherein the cart system further comprises at least one multi-compartment bag coupled to a plurality of straps, wherein the bag is secured to the at least one tower by engagement of the plurality of straps through the plurality of strap slots. The multi-compartment bag defines compartment openings facing outward along a side of the platform. The plurality of straps comprise respective first snap button portions, and a plurality of second snap button portions configured to engage with the first snap button portions to secure the straps about the rim of the at least one tower. The at least one tower defines opposing pluralities of railings along interior opposing vertical surfaces, wherein the railings are configured to slidably receive at least one bin or tray. At least one railing of the pluralities of railings defines a plurality of bumps configured to engage with the at least one bin or tray during sliding of the at least one bin or tray along the at least one railing.

In one embodiment of a tool attachment system for a cart system, where the cart system comprises at least one tower, the tool attachment system may include at least one holder slot defined by the least one tower; and at least one tool holder secured to the at least one tower at the at least one holder slot. The at least one tool holder is engaged with the at least one holder slot by a dovetail joint. The at least one tool holder defines a dovetail, and the at least one tool slot defines a keyhole opening configured to receive the dovetail to form the dovetail joint. The dovetail joint faces a rear of the at least one tool holder. The at least one tool holder defines a lateral tab transverse to the dovetail joint, wherein the lateral tab resists vertical relative movement between the at least one tool holder and the at least one holder slot. The at least one tower defines a lateral dimple adjacent the holder slot and configured to receive the lateral tab. The tool holder comprises a rigid base and an elastomeric member coupled across the rigid base. The rigid base defines a slot, and wherein the elastomeric member defines a tab configured to engage with the slot. The holder slot is defined in a side panel of the tower. The holder slot is defined in an upper rim of the tower. The holder slot comprises a channel extending in a vertical direction across the upper rim, wherein the channel has an open end configured to receive the dovetail, and wherein the channel has a closed end configured to rest against an end of the dovetail.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

That which is claimed is:

1. A rollable structure comprising:
   a lower platform;
   an upper platform;
   a first storage area disposed between the lower platform and the upper platform;
   a second storage area disposed adjacent to the upper platform;
   a first access panel configured to secure the first storage area;
   a second access panel configured to secure the second storage area; and
   a locking mechanism configured to lock both the first access panel and the second access panel in a locked position, wherein the locking mechanism comprises:

a double cam comprising a first hook that engages the first access panel, and a second hook that engages the second access panel;
a body;
a bezel coupled to the body;
a piston configured to rotate inside the body;
a screw configured to couple the double cam to the piston; and
a spring disposed in the body and configured to bias the piston towards the bezel.

2. The rollable structure of claim 1, wherein the first access panel is a door, and wherein the second access panel is a hatch.

3. The rollable structure of claim 1, wherein the first access panel is configured to rotate outwards with respect to the upper platform, and the second access panel is configured to rotate upwards with respect to the upper platform.

4. The rollable structure of claim 1, wherein unlocking the locking mechanism unlocks both the first access panel and the second access panel.

5. The rollable structure of claim 1, wherein the locking mechanism is coupled to the upper platform.

6. The rollable structure of claim 1, wherein the locking mechanism further comprises:
a lock magnet;
wherein the locking mechanism cannot be unlocked when the lock magnet is in the first position.

7. The rollable structure of claim 6, wherein the piston moves axially inside the body during unlocking or locking of the locking mechanism.

8. The rollable structure of claim 6, further comprising:
a key fob configured to engage the locking mechanism, the key fob comprising:
a magnet configured to move the lock magnet to the second position.

9. The rollable structure of claim 8, wherein the key fob further comprises a geometric feature on a face of the key fob.

10. The rollable structure of claim 1, wherein the piston moves axially inside the body during unlocking or locking of the locking mechanism.

11. The rollable structure of claim 1, further comprising:
a key fob configured to engage the locking mechanism, the key fob comprising:
a magnet configured to interact with the bezel.

12. The rollable structure of claim 11, wherein the key fob further comprises a geometric feature on a face of the key fob.

13. A cart comprising:
a lower platform;
an upper platform;
a first storage area disposed between the lower platform and the upper platform;
a second storage area disposed adjacent to the upper platform;
a door configured to secure the first storage area, wherein the door is configured to rotate outwards with respect to the upper platform;
a hatch configured to secure the second storage area, wherein the hatch is configured to rotate upwards with respect to the upper platform; and
a locking mechanism coupled to the upper platform and configured to lock both the hatch and the door in a locked position, wherein unlocking the locking mechanism unlocks both the door and the hatch, wherein the locking mechanism comprises:
a double cam comprising a first hook that engages the hatch, and a second hook that engages the door;
a body;
a bezel coupled to the body;
a piston configured to rotate inside the body, wherein the piston moves axially inside the body during unlocking or locking of the locking mechanism; and
a screw configured to couple the double cam to the piston.

14. The cart of claim 13, wherein the locking mechanism further comprises:
a piston with lock magnet configured to slide inside the body from a first position to a second position;
wherein the locking mechanism cannot be unlocked when lock magnet is in the first position.

15. The cart of claim 13, wherein the locking mechanism comprises:
a spring disposed in the body and configured to bias the piston towards the bezel.

16. The cart of claim 13, further comprising:
a key fob configured to engage the locking mechanism, the key fob comprising:
a magnet; and
a geometric feature on a face of the key fob.

* * * * *